(12) United States Patent
Tanaka et al.

(10) Patent No.: US 8,002,057 B2
(45) Date of Patent: Aug. 23, 2011

(54) HYBRID DRIVE SYSTEM

(75) Inventors: Kazuhiro Tanaka, Chiryu (JP); Jin Izawa, Obu (JP); Yoshinori Oono, Nukata (JP); Kazuo Aoki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 403 days.

(21) Appl. No.: 12/382,044

(22) Filed: Mar. 6, 2009

(65) Prior Publication Data
US 2009/0236160 A1 Sep. 24, 2009

(30) Foreign Application Priority Data
Mar. 24, 2008 (JP) ................................ 2008-076202

(51) Int. Cl.
*B60W 10/00* (2006.01)
(52) U.S. Cl. ........... 180/65.265; 180/65.21; 180/65.235; 903/903
(58) Field of Classification Search ................ 180/65.21, 180/65.235, 65.265, 65.285; 903/903, 905, 903/951; 477/3, 5
See application file for complete search history.

(56) References Cited

U.S. PATENT DOCUMENTS

| | | | |
|---|---|---|---|
| 5,934,395 A | 8/1999 | Koide et al. | |
| 6,555,927 B1* | 4/2003 | Suzuki et al. | 903/903 |
| 6,696,815 B1 | 2/2004 | Kikuchi | |
| 6,862,887 B2* | 3/2005 | Noreikat et al. | 903/951 |
| 7,056,260 B2* | 6/2006 | Nakamori et al. | 477/3 |
| 7,363,996 B2* | 4/2008 | Kamada et al. | 180/65.21 |
| 7,465,251 B2* | 12/2008 | Zhang | 477/5 |
| 7,666,115 B2* | 2/2010 | Ito et al. | 180/65.265 |
| 7,712,560 B2* | 5/2010 | Kozarekar | 180/65.21 |
| 7,713,163 B2* | 5/2010 | Hayashi et al. | 477/3 |
| 7,823,668 B2* | 11/2010 | Ogata et al. | 180/65.265 |
| 7,937,195 B2* | 5/2011 | Kozarekar | 180/65.265 |
| 2003/0064854 A1* | 4/2003 | Kotani | 477/3 |
| 2003/0078134 A1* | 4/2003 | Kojima et al. | 477/3 |
| 2004/0084233 A1* | 5/2004 | Wakuta et al. | 180/65.2 |

FOREIGN PATENT DOCUMENTS

| | | |
|---|---|---|
| JP | A-9-170533 | 6/1997 |
| JP | A-2003-153462 | 5/2003 |
| JP | A-2007-182181 | 7/2007 |

* cited by examiner

*Primary Examiner* — Hau Phan
(74) *Attorney, Agent, or Firm* — Oliff & Berridge, PLC

(57) ABSTRACT

A hybrid drive system includes an input member connected to an engine; an output member connected to a wheel; a first rotating electric machine; a second rotating electric machine; a differential gearing; a controller that controls the first rotating electric machine and the second rotating electric machine; and an electric power supplier that supplies the first rotating electric machine and the second rotating electric machine with electric power.

8 Claims, 10 Drawing Sheets

HYBRID DRIVE SYSTEM

INCORPORATION BY REFERENCE

The disclosure of Japanese Patent Application No. 2008-076202 filed on Mar. 24, 2008 including the specification, drawings and abstract is incorporated herein by reference in its entirety.

BACKGROUND

The present invention relates to a hybrid drive system.

In recent years, hybrid vehicles having an engine and a rotating electric machine (a motor or a generator) as drive power sources are gaining attention from the viewpoints of energy savings and environmental issues. Various arrangements have been proposed for hybrid drive systems used in the hybrid vehicles. Many of these hybrid vehicles, even without having a rotating electric machine dedicated to starting the engine, permit the engine to be started using a rotating electric machine for driving the vehicle. Japanese Patent Application Publication No. JP-A-09-170533, for example, discloses a hybrid drive system that allows an engine to be started using a rotating electric machine for driving a vehicle.

In other words, the system disclosed in Japanese Patent Application Publication No. JP-A-09-170533 is a so-called split-type hybrid drive system including an engine operated by the combustion of a fuel, a distribution mechanism mechanically distributing an output of the engine to a first rotating electric machine and an output member, and a second rotating electric machine applying a rotating force between the output member and a drive wheel. The hybrid drive system is arranged to start the engine by using the first rotating electric machine that rotatably drives the engine through the distribution mechanism. The hybrid drive system further includes a driving force fluctuation inhibition unit that inhibits a vehicle driving force from fluctuating, which would otherwise be caused by a reaction force acting on the output member when the engine is started or the like. The driving force fluctuation inhibition unit is a parking lock unit that mechanically prevents the wheel from rotating through a parking operation performed by a driver or a startup timing motor controller that controls the second rotating electric machine so as to offset fluctuations in the driving force caused by engine starting.

SUMMARY

If, for example, an attempt is made to start the engine or sudden acceleration is performed in an environment such as when an outside temperature is low, in which a battery supplying the rotating electric machine with an electric power is unable to exhibit fully performance thereof, a battery voltage can at times drop suddenly as a result of the rotating electric machine outputting a large torque. A drop in the battery voltage poses a problem in that the output of the rotating electric machine decreases and the vehicle power performance is degraded, resulting further in a shorter service life of the battery. This calls for control for restoring the battery voltage to a normal state if the battery runs into a low voltage state. Specifically, if the engine is in an operating state, the battery voltage can be restored to the normal state by limiting the output torque of the second rotating electric machine that functions mainly as a motor to thereby limit a battery current used in the second rotating electric machine. If the engine is in a stationary state, on the other hand, the first rotating electric machine is used to rotatably drive the engine to thereby start the engine and the driving force of the engine is thereafter used to charge the battery with the electric power generated by the first rotating electric machine, so that the battery voltage can be restored to the normal state. At this time, too, it is necessary to limit the output torque of the second rotating electric machine to thereby limit the battery current used in the second rotating electric machine in order to make available the electric power required for driving the first rotating electric machine when the engine is started and promptly restore the battery voltage to the normal state.

When the output torque of the second rotating electric machine is limited during control of the output torque of the second rotating electric machine for offsetting the fluctuations in the driving force as a result of engine starting as described above, however, there may be cases where an appropriate control of the second rotating electric machine cannot be provided for offsetting the fluctuations in the driving force. In this case, the output torque of the first rotating electric machine for starting the engine is transmitted to the wheel, so that fluctuations in the driving force of the vehicle, not expected by the driver, may occur.

The present invention has been made in view of the foregoing problems to provide a hybrid drive system capable of restoring a voltage of an electric power supplier to a normal state when the electric power supplier, such as a battery, runs into a low voltage state and inhibiting fluctuations in a driving force of a vehicle not expected by a driver from occurring as a result of an output torque of a first rotating electric machine for starting an engine being transmitted to a wheel. The present invention can also achieve various other advantages.

According to an exemplary aspect of the invention, a hybrid drive system includes an input member connected to an engine; an output member connected to a wheel; a first rotating electric machine; a second rotating electric machine; a differential gearing; a controller that controls the first rotating electric machine and the second rotating electric machine; and an electric power supplier that supplies the first rotating electric machine and the second rotating electric machine with electric power. The differential gearing includes a first rotating element, a second rotating element, and a third rotating element, the first rotating electric machine is connected to the first rotating element, the input member is connected to the second rotating element, and at least one of the output member and the second rotating electric machine is connected to the third rotating element. The controller performs a fluctuation offset control that controls an output torque of the second rotating electric machine so as to offset torque fluctuations of the output member caused by fluctuations in an output torque of the first rotating electric machine. The controller performs a torque limiting control that limits the output torque of the first rotating electric machine in a positive direction, while limiting the output torque of the second rotating electric machine, when the electric power supplier runs into a predetermined low voltage state.

BRIEF DESCRIPTION OF THE DRAWINGS

Various exemplary aspects of the invention will be described with reference to the drawings, wherein.

DETAILED DESCRIPTION OF EMBODIMENTS

1. First Embodiment

Figure 1:
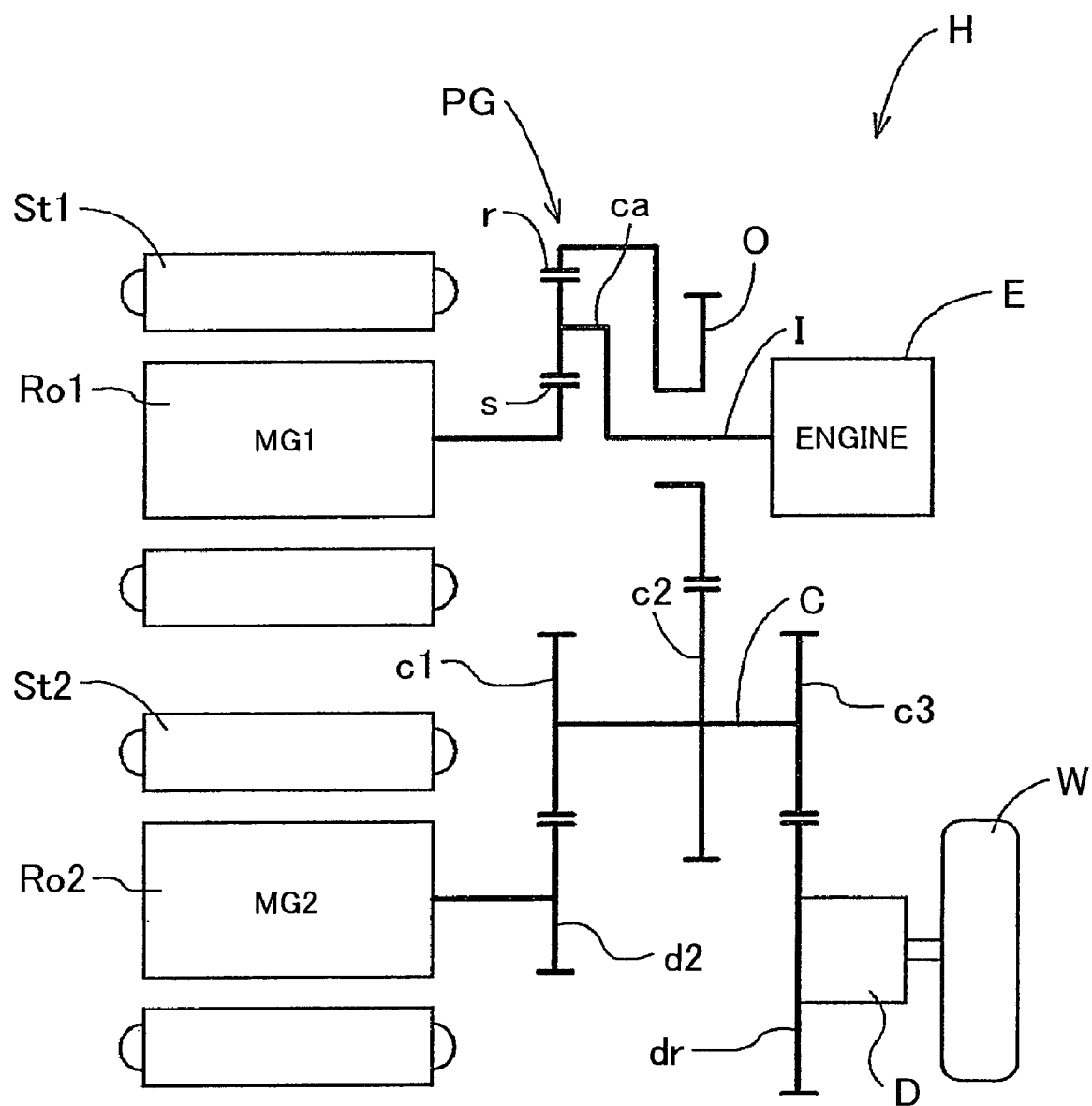
FIG. 1 is a skeleton diagram showing the mechanical arrangement of a hybrid drive system according to an embodiment of the present invention.
Figure 2:
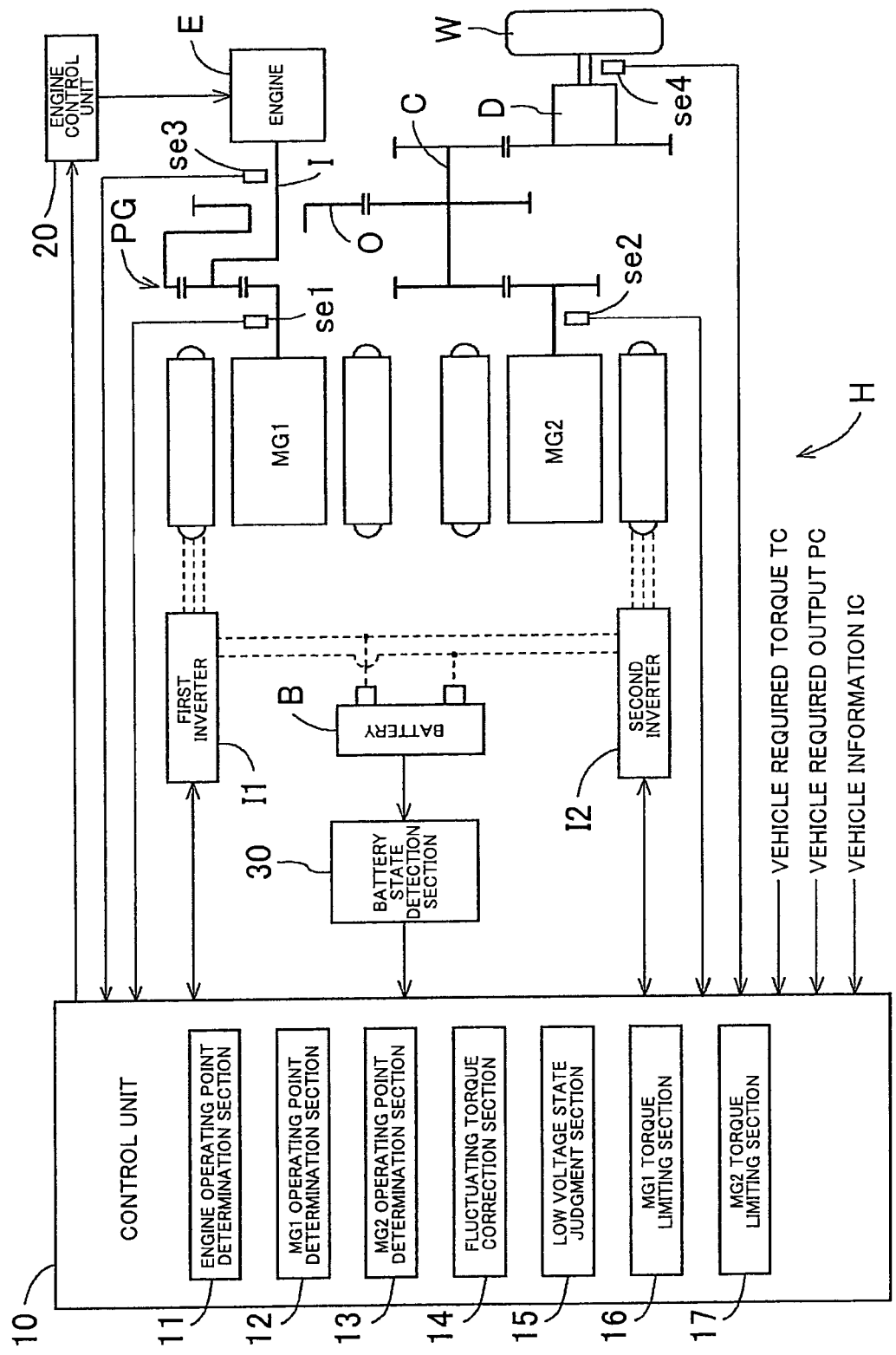
FIG. 2 is a block diagram showing the system configuration of this hybrid drive system.

A first embodiment of the present invention will be described with reference to the drawings. FIG. 1 is a skeleton diagram showing the mechanical arrangement of a hybrid drive system H according to this embodiment. FIG. 2 is a block diagram showing the system configuration of this hybrid drive system H according to this embodiment. Note that, in FIG. 2, the broken line denotes a transmission path of an electric power and the solid line arrow denotes a transmission path of various types of information. As shown in FIG. 1, the hybrid drive system H is structured as a so-called two-motor split type hybrid drive system H including an engine E, two motor generators MG1, MG2, and a power distribution planetary gear set PG. The engine E and the motor generators MG1, MG2 serve as drive power sources. The power distribution planetary gear set PG distributes an output from the engine E to a side of the first motor generator MG1 and to a side of a wheel W and the second motor generator MG2.

Specifically, the hybrid drive system H includes, as mechanical arrangements, an input shaft I connected to the engine E, the first motor generator MG1, the second motor generator MG2, the power distribution planetary gear set PG, a counter gearing C, and an output differential gearing D distributing the driving force to a plurality of wheels W. Note herein that the planetary gear set PG distributes the output (driving force) of the engine E to the first motor generator MG1 and a counter drive gear O. The counter drive gear O is connected to the wheel W via the counter gearing C and the output differential gearing D. The second motor generator MG2 is connected so as to be capable of transmitting an output torque to a power transmission system from the counter drive gear O to the output differential gearing D. Specifically, the second motor generator MG2 is connected to the counter gearing C and connected via the counter gearing C to the counter drive gear O and the output differential gearing D. In this embodiment, the first motor generator MG1 corresponds to a "first rotating electric machine" according to an aspect of the present invention and the second motor generator MG2 corresponds to a "second rotating electric machine" according to an aspect of the present invention. In addition, the input shaft I corresponds to an "input member" according to an aspect of the present invention and the counter drive gear O corresponds to an "output member" according to an aspect of the present invention. Further, the power distribution planetary gear set PG corresponds to a "differential gearing" according to an aspect of the present invention.

In addition, the hybrid drive system H includes, as an electrical system configuration, a first inverter I1, a second inverter I2, a battery B, and a control unit 10. Specifically, the first inverter I1 drivingly controls the first motor generator MG1. The second inverter I2 drivingly controls the second motor generator MG2. The battery B supplies the electric power to the first motor generator MG1 and the second motor generator MG2 via the first inverter I1 or the second inverter I2. The control unit 10 controls different parts of the hybrid drive system H. In this embodiment, the control unit 10 corresponds to a "controller" according to an aspect of the present invention and the battery B corresponds to an "electric power supplier" according to an aspect of the present invention. Arrangements of the different parts of the hybrid drive system H will be described in sequence below.

1-1. Mechanical Arrangements

The mechanical arrangements of the hybrid drive system H will first be described. As shown in FIG. 1, in the hybrid drive system H, the input shaft I connected to the engine E, the first motor generator MG1, and the power distribution planetary gear set PG are disposed coaxially. The second motor generator MG2, the counter gearing C, and the output differential gearing D are disposed, respectively, on a shaft extending in parallel with the input shaft I. Note herein that, for the engine E, a gasoline engine, a diesel engine, or any other well-known type of internal combustion engine may be used. A first counter driven gear c1, a second counter driven gear c2, and a differential pinion gear c3 are secured, in that order from the side of the first motor generator MG1 and the second motor generator MG2, to a shaft (counter shaft) of the counter gearing C. Note herein that the differential pinion gear c3 is in mesh with a differential ring gear dr of the output differential gearing D, so that rotation of the counter gearing C is transmitted to the wheel W via the output differential gearing D. The output differential gearing D is a commonly used one and structured, for example, to include a differential gear mechanism incorporating a plurality of bevel gears meshing with each other.

The first motor generator MG1 includes a stator St1 fixed to a case (not shown) and a rotor Ro1 rotatably supported on a radially inward side of the stator St1. The rotor Ro1 of the first motor generator MG1 is connected so as to be integrally rotatable with a sun gear s of the planetary gear set PG. The second motor generator MG2 includes a stator St2 fixed to a case (not shown) and a rotor Ro2 rotatably supported on a radially inward side of the stator St2. The rotor Ro2 of the second motor generator MG2 is connected so as to be integrally rotatable with a second motor generator output gear d2 (hereinafter referred to as "MG2 output gear"). The MG2 output gear d2 meshes with the first counter driven gear c1 fixed to the counter gearing C, so that rotation of the second motor generator MG2 is transmitted to the counter gearing C. This results in the rotor Ro2 of the second motor generator MG2 rotating at a rotating speed proportional to the rotating speed of the counter gearing C and the counter drive gear O. In the hybrid drive system H, the first motor generator MG1 and the second motor generator MG2 are AC motors drivingly controlled by the first inverter I1 and the second inverter I2, respectively.

In this example, the first motor generator MG1 functions as a generator that mainly generates electricity using the driving force inputted via the sun gear s to charge the battery B, or supplies the electric power for driving the second motor generator MG2. Note, however, that the first motor generator MG1 may perform power running to function as a motor that outputs the driving force when, for example, the vehicle is running at high speeds or the engine E is started. The second motor generator MG2, on the other hand, mainly functions as a motor assisting the driving force for running the vehicle. During, for example, deceleration of the vehicle, however, the second motor generator MG2 may function as a generator regenerating a vehicle inertia force as electric energy. Operations of the first motor generator MG1 and the second motor generator MG2 are controlled by the first inverter I1 and the second inverter I2 that operate in accordance with a control command from the control unit 10.

As shown in FIG. 1, the planetary gear set PG is structured by a single pinion type planetary gear mechanism disposed coaxially with the input shaft I. In other words, the planetary gear set PG includes, as rotating elements, a carrier ca supporting a plurality of pinion gears, and the sun gear s and a ring gear r meshing with each of the pinion gears. The sun gear s is connected so as to be integrally rotatable with the rotor Ro1 of the first motor generator MG1. The carrier ca is connected so as to be integrally rotatable with the input shaft I. The ring gear r is connected so as to be integrally rotatable with the counter drive gear O. The counter drive gear O meshes with the second counter driven gear c2 fixed to the counter gearing C, so that rotation of the ring gear r of the planetary gear set PG is transmitted to the counter gearing C. In this embodiment, the sun gear s, the carrier ca, and the ring gear r correspond, respectively, to a "first rotating element", a "second rotating element", and a "third rotating element" of a differential gearing according to an aspect of the present invention.

1-2. Basic Operations of the Hybrid Drive System

Basic operations of the hybrid drive system H according to this embodiment will next be described. FIGS. 3 to 6 are speed diagrams, each representing operating states of the power distribution planetary gear set PG. In these speed diagrams, a plurality of vertical lines disposed in parallel with each other corresponds to the rotating elements of the planetary gear set PG, "s", "ca", and "r" placed at an upper end of each vertical line corresponding to the sun gear s, the carrier ca, and the ring gear r, respectively. A specific point on each of these ordinates corresponds to a specific rotating speed of each rotating element. Herein, the rotating speed is zero on the abscissa with any point on an upper side being positive and on a lower side being negative. In addition, the spacing between the vertical lines corresponding to different rotating elements corresponds to a gear ratio λ of the planetary gear set PG (ratio of the numbers of teeth between the sun gear and the ring gear=[the number of teeth of the sun gear]/[the number of teeth of the ring gear]). Note herein that, in the planetary gear set PG, the carrier ca is connected so as to be integrally rotatable with the engine E and the input shaft I, the sun gear s is connected so as to be integrally rotatable with the rotor Ro1 of the first motor generator MG1, and the ring gear r is connected so as to be integrally rotatable with the counter drive gear O as the output member. Accordingly, the rotating speed of the carrier ca coincides with a engine rotating speed NE that is the rotating speed of the engine E and the input shaft I, the rotating speed of the sun gear s coincides with an MG1 rotating speed N1 that is the rotating speed of the first motor generator MG1, and the rotating speed of the ring gear r coincides with an output rotating speed No that is the rotating speed of the counter drive gear O. Using the gear ratio λ of the planetary gear set PG, therefore, the following rotating speed relational expression (expression 1) holds true among the engine rotating speed NE, the MG1 rotating speed N1, and the output rotating speed No.

$$NE = (No + \lambda \cdot N1)/(\lambda + 1) \quad \text{(Expression 1)}$$

On the speed diagrams of FIGS. 3 through 6, "white triangle" denotes the engine rotating speed NE, "white circle" denotes the MG1 rotating speed N1, and "white star" denotes the output rotating speed No. Further, arrows placed adjacent the different rotating elements denote: an engine torque TE that is torque of the engine E acting on the carrier ca; an MG1 torque T1 that is torque of the first motor generator MG1 acting on the sun gear s; an MG2 torque T2 that is torque of the second motor generator MG2 acting on the ring gear r; and a running torque To that is torque from the wheel W acting on the ring gear r (torque required for running the vehicle), respectively. Note that the upward-pointing arrow indicates torque in a positive direction, while a downward-pointing arrow indicates torque in a negative direction. As shown in FIGS. 3 through 6, not only the running torque To acting via the output differential gearing D and the counter gearing C from the wheel W, but also the output torque of the second motor generator MG2 acting via the counter gearing C act on the counter drive gear O (ring gear r) shown by "white star". Note herein that the following torque relational expression (expression 2) holds true among the engine torque TE, the MG1 torque T1, the MG2 torque T2, and the running torque To using the gear ratio λ of the planetary gear set PG.

$$TE:T1:(T2+To) = (1+\lambda):(-\lambda):(-1) \quad \text{(Expression 2)}$$

Figure 3:
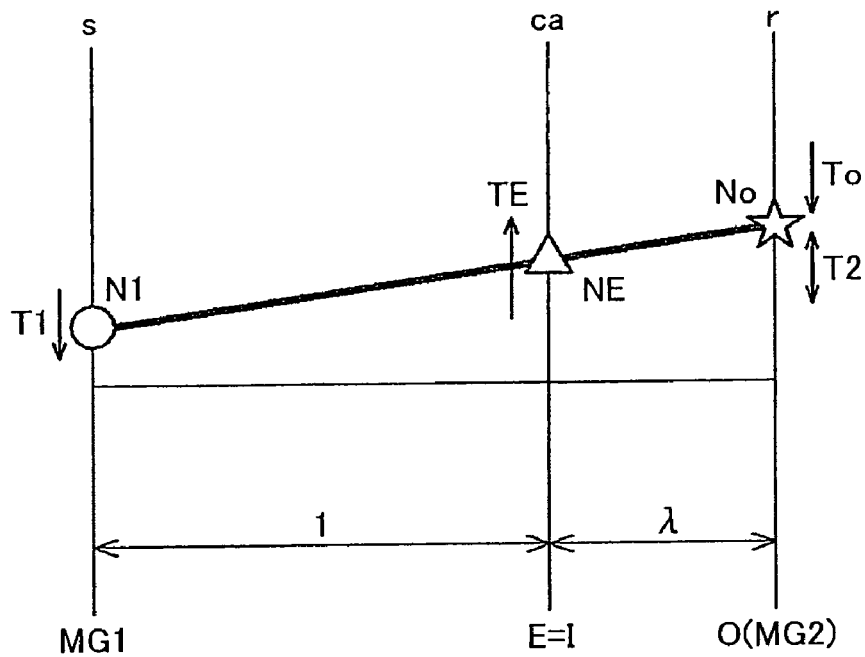
FIG. 3 is a speed diagram in a hybrid drive mode of the hybrid drive system.

FIG. 3 is a speed diagram in a hybrid drive mode running using the output torque of both the engine E and the two motor generators MG1, MG2. In this mode, the engine E outputs the engine torque TE in the positive direction corresponding to a driving force requirement (a vehicle required torque TC and a vehicle required output PC to be described later) from the vehicle side, while being controlled such that a condition of high efficiency and a small amount of exhaust gases can be maintained (generally so as to achieve optimum fuel economy characteristics), and the engine torque TE is transmitted to the carrier ca via the input shaft I. The first motor generator MG1 outputs the MG1 torque T1 in the negative direction. The MG1 torque T1 is transmitted to the sun gear s and functions as a reaction force receiver supporting a reaction force of the engine torque TE. Then, the planetary gear set PG distributes the engine torque TE to the first motor generator MG1 and the counter drive gear O that is the side of the wheel W. The second motor generator MG2 outputs the MG2 torque T2 in the positive or negative direction as appropriately according to, for example, the driving force requirement or the vehicle running condition to assist in the driving force distributed to the counter drive gear O.

Figure 4:
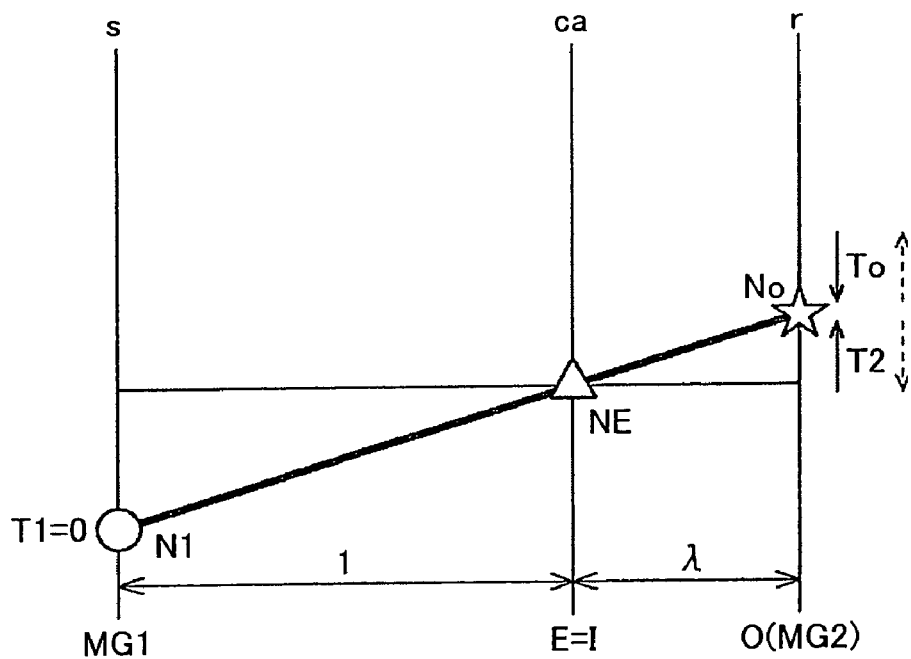
FIG. 4 is a speed diagram in an EV drive mode of the hybrid drive system.

FIG. 4 is a speed diagram in an EV (electrically driven) drive mode running only with the output torque of the second motor generator MG2. In this mode, the second motor generator MG2 outputs the MG2 torque T2 in accordance with the driving force requirement from the vehicle side. Specifically, when the driving force in a direction of making the vehicle accelerate or cruise is required, the second motor generator MG2 performs power running, while rotating in the positive direction, to thereby output the MG2 torque T2 in the positive direction in order to let the vehicle move forward against the running torque To corresponding to running resistance acting on the counter drive gear O in the negative direction as shown by the solid line arrows in FIG. 4. When, on the other hand, the driving force in a direction of making the vehicle decelerate is required, the second motor generator MG2 performs energy regeneration (generates electricity), while rotating in the positive direction, to thereby output the MG2 torque T2 in the negative direction in order to let the vehicle decelerate against the running torque To corresponding to the vehicle inertia force acting on the counter drive gear O in the positive direction as shown by the broken line arrows in FIG. 4. In this EV drive mode, the first motor generator MG1 is controlled such that the MG1 torque T1 is zero, and in a freely rotatable state without preventing rotation of the sun gear s by the MG2 torque T2. This results in the MG1 rotating speed N1 becoming negative (specifically, the first motor generator MG1 rotating in the negative direction). In addition, the engine E is set into a stationary state with fuel supply stopped and, moreover, the engine rotating speed NE is zero due to a friction force inside the engine E. In other words, in the EV drive mode, the ring gear r connected to the counter drive gear O and the second motor generator MG2 rotates in the positive direction (rotating speed being positive) and the sun gear s connected to the first motor generator MG1 rotates in the negative direction (rotating speed being negative) with the carrier ca as a pivot in the planetary gear set PG.

Figure 5:
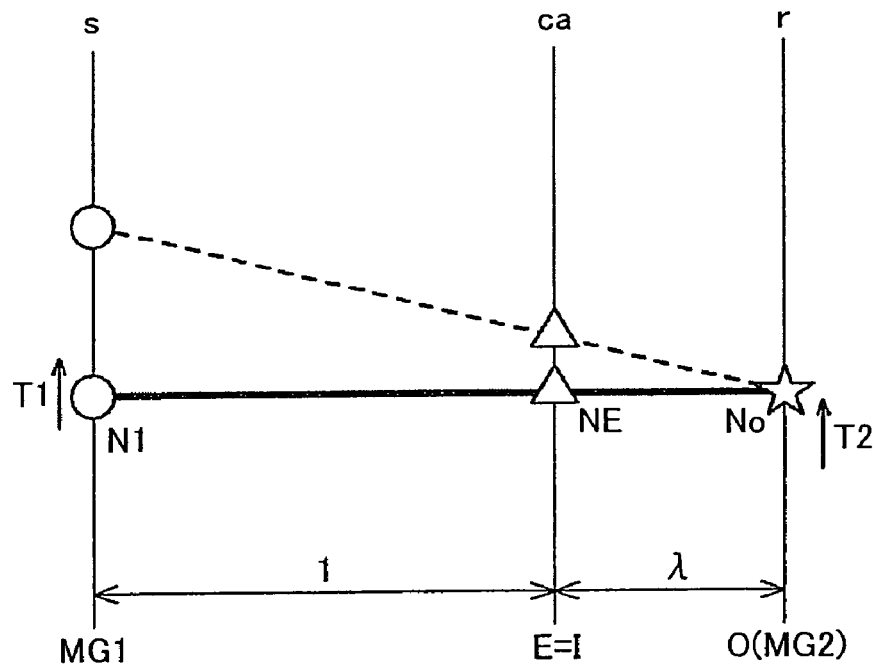
FIG. 5 is a speed diagram for illustrating an engine start operation from a vehicle stationary state.

FIG. 5 is a speed diagram for illustrating operations when the engine E is started from a condition in which the vehicle (wheel W) is stationary. In FIG. 5, the solid line represents a condition in which the engine E and the wheel W are stationary. In this condition, the engine E, the first motor generator MG1, and the second motor generator MG2 produce zero output torque and rotating speed. To start the engine E from this condition, the first motor generator MG1 outputs the MG1 torque T1 in the positive direction to increase the rotating speed of the engine E via the planetary gear set PG as shown in the broken line in FIG. 5. When the engine E then reaches a predetermined engine startable speed or higher, the fuel supply and ignition for the engine E is started to start the engine E. To inhibit fluctuations in the MG1 torque T1 from being transmitted from the counter drive gear O to the wheel W via the counter gearing C and the output differential gearing D during such an engine start sequence, the hybrid drive system H performs a fluctuation offset control that controls the MG2 torque T2 so as to offset torque fluctuations of the counter drive gear O caused by the fluctuations in the MG1 torque T1. Specifically, at engine starting from the vehicle (wheel W) stationary condition, the second motor generator MG2 outputs the MG2 torque T2 in the positive direction corresponding to a reaction force opposing the MG1 torque T1 in the positive direction. The MG2 torque T2 outputted by the second motor generator MG2 at this time is a value appropriate for offsetting to eliminate the torque fluctuations of the counter drive gear O and keeping the rotating speed of the counter drive gear O (ring gear r) at zero. This value is calculated by a fluctuating torque correction section 14 of the control unit 10 to be described later.

Figure 6:
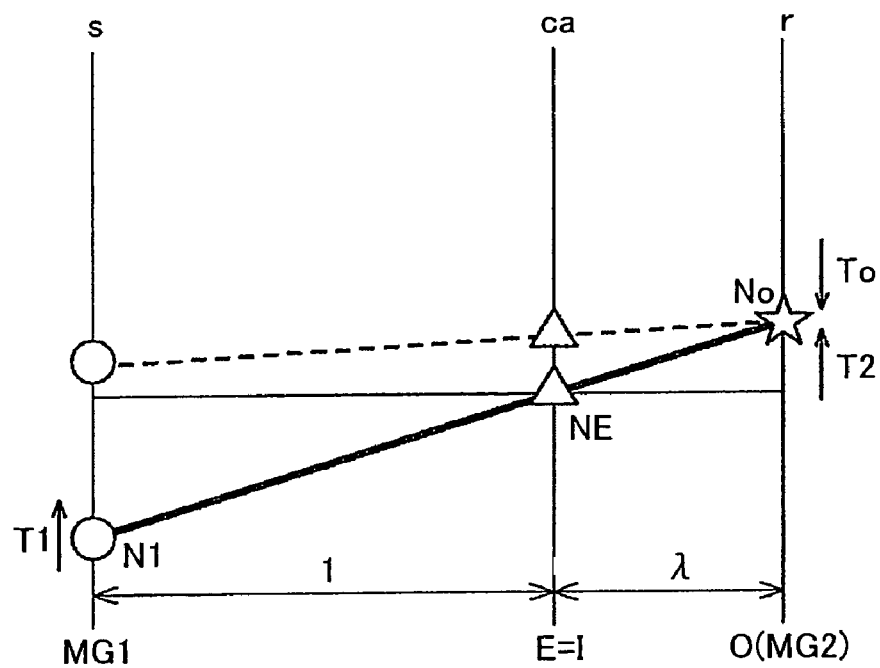
FIG. 6 is a speed diagram for illustrating an engine start operation from the EV drive mode.

FIG. 6 is a speed diagram for illustrating operations when the engine E is started from the EV drive mode shown in FIG. 4. In FIG. 6, the solid line represents the conditions during running in the EV drive mode as described with reference to FIG. 4. Herein, the second motor generator MG2 performs power running by outputting the MG2 torque T2 in the positive direction, while rotating in the positive direction. Additionally, with the engine E, the engine torque TE and the engine rotating speed NE are zeroed, while with the first motor generator MG1, the MG1 torque T1 is zeroed and the MG1 rotating speed N1 is negative. When the engine E is to be started from this condition, the first motor generator MG1 outputs the MG1 torque T1 in the positive direction to increase the rotating speed of the engine E via the planetary gear set PG as shown in the broken line in FIG. 6. At this time, the first motor generator MG1 performs energy regeneration (generates electricity) when the MG1 rotating speed N1 is in a negative state, but after the MG1 rotating speed N1 becomes positive, performs power running to consume the electric power of the battery B. When the engine E then reaches a predetermined engine startable speed or higher, the fuel supply and ignition for the engine E is started to start the engine E. To inhibit fluctuations in the MG1 torque T1 from being transmitted from the counter drive gear O to the wheel W via the counter gearing C and the output differential gearing D during such an engine start sequence, the hybrid drive system H performs the fluctuation offset control that controls the MG2 torque T2 so as to offset torque fluctuations of the counter drive gear O caused by the fluctuations in the MG1 torque T1. In the example shown in FIG. 6, the second motor generator MG2 outputs the MG2 torque T2 that is torque in the positive direction corresponding to a reaction force opposing the MG1 torque T1 in the positive direction added to an MG2 torque command value of an MG2 operating point determined by an MG2 operating point determination section 13 according to a vehicle required torque TC. The MG2 torque T2 to be added at this time is a value appropriate offsetting and eliminating the torque fluctuations in the counter drive gear O. This value is calculated by the fluctuating torque correction section 14 of the control unit 10 to be described later.

1-3. System Configuration

The electric system configuration of the hybrid drive system H will next be described below. As shown in FIG. 2, in the hybrid drive system H, the first inverter I1 for drivingly controlling the first motor generator MG1 is electrically connected to a coil of the stator St1 of the first motor generator MG1. Similarly, the second inverter I2 for drivingly controlling the second motor generator MG2 is electrically connected to a coil of the stator St2 of the second motor generator MG2. The first inverter I1 and the second inverter I2, while being electrically connected to each other, are electrically connected to the battery B. The first inverter I1 converts DC electric power supplied from the battery B or DC electric power, as generated by the second motor generator MG2 and converted and supplied by the second inverter I2, into AC electric power and supplies the AC electric power to the first motor generator MG1. Further, the first inverter I1 converts the electric power generated by the first motor generator MG1 from AC into DC and supplies the resultant DC electric power to the battery B or the second inverter I2. Similarly, the second inverter I2 converts DC electric power supplied from the battery B or DC electric power, as generated by the first motor generator MG1 and converted and supplied by the first inverter I1, into AC electric power and supplies the AC electric power to the second motor generator MG2. Further, the second inverter I2 converts the electric power generated by the second motor generator MG2 from AC into DC and supplies the resultant DC electric power to the battery B or the first inverter I1.

The first inverter I1 and the second inverter I2 control, for example, a current value, and frequency and phase of an AC waveform to be supplied to the first motor generator MG1 and the second motor generator MG2, respectively, in accordance with a control signal from the control unit 10. The first inverter I1 and the second inverter I2 thereby drivingly control the first motor generator MG1 and the second motor generator MG2, respectively, to achieve the output torque and speed according to the control signal from the control unit 10.

The battery B is electrically connected to the first inverter I1 and the second inverter I2. The battery B is formed from, for example, a nickel-metal hydride secondary battery or a lithium-ion secondary battery. The battery B supplies the first inverter I1 and the second inverter I2 with a DC electric power and is charged by a DC electric power generated by the first motor generator MG1 or the second motor generator MG2 and supplied via the first inverter I1 or the second inverter I2.

The hybrid drive system H includes a battery state detection section 30 that serves as a battery state detector detecting the state of the battery B. Herein, the battery state detection section 30 includes a current sensor, a temperature sensor, and various other types of sensors, in addition to a voltage sensor detecting a voltage across positive and negative electrodes of the battery B, to thereby detect the battery voltage and the amount of charge of the battery (SOC: state of charge). The information of the detection results of the battery state detection section 30 is outputted to the control unit 10.

The hybrid drive system H also includes a first motor generator rotating speed sensor Se1 (hereinafter referred to as "MG1 rotating speed sensor"), a second motor generator rotating speed sensor Se2 (hereinafter referred to as "MG2 rotating speed sensor"), an engine rotating speed sensor Se3, and a vehicle speed sensor Se4. The MG1 rotating speed sensor Se1 detects the MG1 rotating speed N1 that is the rotating speed of the rotor Ro1 of the first motor generator MG1. The MG2 rotating speed sensor Se2 detects an MG2 rotating speed N2 that is the rotating speed of the rotor Ro2 of the second motor generator MG2. The engine rotating speed sensor Se3 detects the engine rotating speed NE that is the rotating speed of a crankshaft of the engine E or the input shaft I. The vehicle speed sensor Se4 detects the rotating speed of the wheel W, i.e., the vehicle speed. These rotating speed sensors Se1 to Se4 are formed from, for example, a resolver or a hall IC. Detection results of each of these sensors Se1 to Se4 are outputted to the control unit 10.

1-4. Arrangements of the Control Unit

The control unit 10 controls operations of each of different parts of the hybrid drive system H. In this embodiment, the control unit 10 includes an engine operating point determination section 11, a first motor generator operating point determination section 12 (hereinafter referred to as "MG1 operating point determination section"), a second motor generator operating point determination section 13 (hereinafter referred to as "MG2 operating point determination section"), the fluctuating torque correction section 14, a low voltage state judgment section 15, a first motor generator torque limiting section 16 (hereinafter referred to as "MG1 torque limiting section"), and a second motor generator torque limiting section 17 (hereinafter referred to as "MG2 torque limiting section"). The control unit 10 is adapted to further include, for example, at least one arithmetic processing unit and a storage medium, such as RAM or ROM, for storing therein, for example, software (programs) or data. Each of the foregoing functional sections 11 to 17 of the control unit 10 is configured to include hardware or software or both for performing various types of processing for data inputted thereto, with the arithmetic processing unit as a core member. Further, the control unit 10 is connected so as to be capable of communicating with an engine control unit 20 that performs operation control of the engine E. In addition, the information on detection results of the battery state detection section 30 and on detection results of each of the sensors Se1 to Se4 are arranged to be inputted to the control unit 10 as described above.

This embodiment is arranged such that the vehicle required torque TC, the vehicle required output PC, and vehicle information IC from the vehicle side are inputted to the control unit 10. Specifically, the vehicle required torque TC is torque that is required to be transmitted to the wheel W in order to make the vehicle run appropriately in accordance with the operation performed by a driver. The vehicle required torque TC is therefore determined by referring, for example, to a predetermined map according to the amount of operation of an accelerator pedal and a brake pedal of the vehicle and the vehicle speed detected by the vehicle speed sensor Se4. The vehicle required output PC is an output (power) which the engine E is required to generate based on consideration also of the state of charge of the battery B. The vehicle required output PC is therefore determined by referring, for example, to a predetermined map according to the vehicle required torque TC, the vehicle speed detected by the vehicle speed sensor Se4, and the amount of charge of the battery B detected by a battery state detection sensor Se5. In this embodiment, the vehicle required torque TC and the vehicle required output PC are determined as torque or an output to be transmitted to the counter drive gear O as the output member of the hybrid drive system H. The vehicle information IC represents information of various types indicating vehicle conditions, including, for example, a range (range such as "P", "D", or "R") selected with a select lever of an automatic transmission, an operating condition of a parking brake, and an operating condition of a service brake.

The engine operating point determination section 11 performs operations for determining an engine operating point as the operating point of the engine E. Note that the engine operating point is a control command value representing a control target point of the engine E and determined by the speed and torque. The engine operating point determination section 11 also determines engine operation or stop, specifically, whether to operate or stop the engine E. The determination of the engine operation or stop is made by referring, for example, to a predetermined map according to the vehicle required torque TC and the vehicle speed detected by the vehicle speed sensor Se4. If a decision is made to operate the engine E, the engine operating point determination section 11 determines the engine operating point. The engine operating point determination section 11 outputs information on the engine operating point determined to the engine control unit 20. The engine control unit 20 controls such that the engine E is operated at the torque and the rotating speed specified by the engine operating point. If a decision is made to stop the engine E, on the other hand, the engine operating point determination section 11 outputs the corresponding command to the engine control unit 20. Note that the engine E stop command may be in the form of a command of an engine operating point, in which both the engine rotating speed command value and the engine torque command value are zero.

Figure 7:
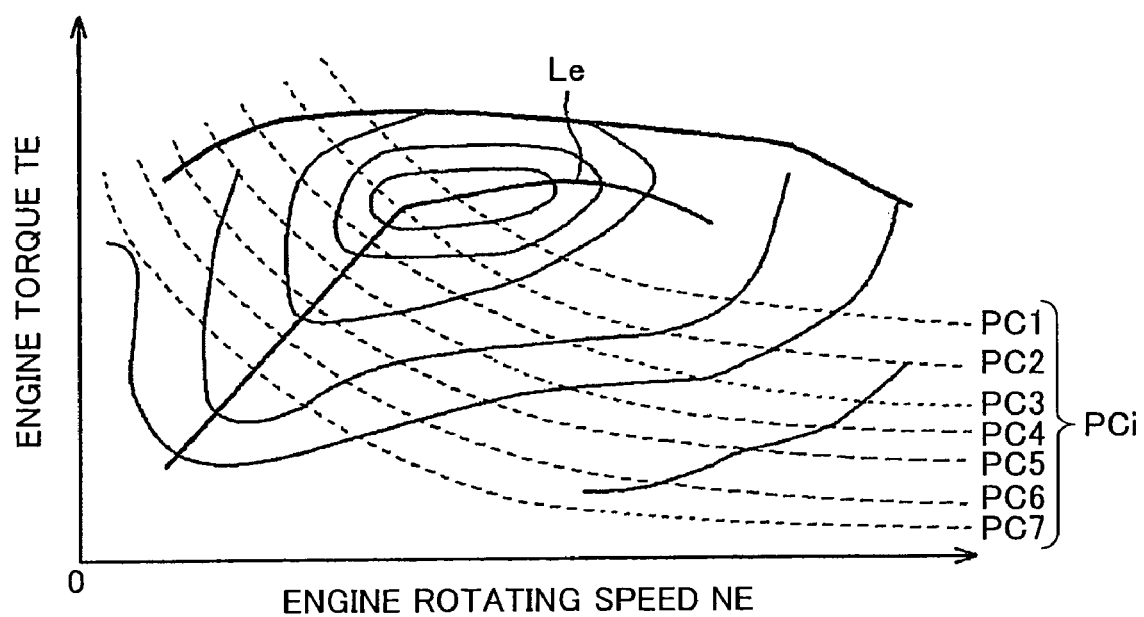
FIG. 7 is a graph showing a typical engine operating point map.

The engine operating point is the control command value representing the control target point of the engine E as determined in consideration of the vehicle required output PC and optimum fuel economy, determined by the engine rotating speed command value and the engine torque command value. The determination of the engine operating point is made based on an engine operating point map. FIG. 7 is a graph showing a typical engine operating point map. In the map, the ordinate represents the engine torque TE and the abscissa represents the engine rotating speed NE. In the map, the narrow solid line represents an equivalent fuel consumption rate, indicating that the further outward the line goes, the higher the fuel consumption rate (poor fuel economy). The broken line represents an equivalent output line PCi (i=1, 2, 3, . . . ). The broad solid line represents an optimum fuel economy line Le, connecting the lowest points of the fuel consumption rate (good fuel economy) on the equivalent output line PCi. Accordingly, the engine operating point determination section 11 determines the engine rotating speed NE and the engine torque TE at an intersection point between the equivalent output line PCi representing the same output as the vehicle required output PC and the optimum fuel economy line Le as the engine rotating speed command value and the engine torque command value of the engine operating point. Note that, in FIG. 7, there are shown only seven equivalent output lines PCi for the sake of simplicity; it would, however, be preferable if a greater number of equivalent output lines PCi at even smaller intervals be recorded on an actual engine operating point map.

The MG1 operating point determination section 12 performs operations for determining an MG1 operating point as the operating point of the first motor generator MG1. Note that the MG1 operating point is a control command value representing a control target point of the first motor generator MG1 and determined by the rotating speed and torque. The control unit 10 controls the first inverter I1 such that the first motor generator MG1 is operated at the torque and the rotating speed specified by the MG1 operating point established by the MG1 operating point determination section 12. The MG1 operating point is a command value representing the control target point of the first motor generator MG1 determined based on the engine operating point determined as described above and the rotating speed of the rotating member connected to the side of the wheel W by the power distribution planetary gear set PG and established by an MG1 rotating speed command value and an MG1 torque command value. In this example, the MG1 operating point determination section 12 calculates, based on the vehicle speed detected by the vehicle speed sensor Se4 and the gear ratio of rotating members between the counter drive gear O and the wheel W, the output rotating speed No that is the rotating speed of the counter drive gear O at that particular vehicle speed. The MG1 operating point determination section 12 then defines the engine rotating speed command value at the engine operating point as the engine rotating speed NE, replaces the engine rotating speed NE and the output rotating speed No with the respective specific values in the rotating speed relational expression (expression 1), and establishes the MG1 rotating speed N1 calculated from the speed relational expression (expression 1) as the MG1 rotating speed command value. The MG1 operating point determination section 12 also establishes the MG1 torque command value through a feedback control, such as proportional-integral control (PI control), based on a difference in the rotating speed between the MG1 rotating speed command value established and the MG1 rotating speed N1 of the first motor generator MG1 detected by the MG1 rotating speed sensor Se1. The MG1 rotating speed command value and the MG1 torque command value established through the foregoing procedure serve as the MG operating point.

The MG2 operating point determination section 13 performs operations for determining an MG2 operating point as the operating point of the second motor generator MG2. Note that the MG2 operating point is a control command value representing a control target point of the second motor generator MG2 and determined by the rotating speed and torque. The control unit 10 controls the second inverter I2 such that the second motor generator MG2 is operated at the torque and the rotating speed specified by the MG2 operating point established by the MG2 operating point determination section 13. The MG2 operating point is a control command value representing the control target point of the second motor generator MG2 determined based on the vehicle required torque TC, the engine operating point, and the MG1 operating point and established by an MG2 rotating speed command value and an MG2 torque command value. The following torque relational expression (expression 3) is derived by modifying the torque relational expression (expression 2).

$$T2 = -T_0 - TE/(1+\lambda)$$ (Expression 3)

The MG2 operating point determination section 13 thus defines the MG2 torque T2 as the MG2 torque command value, wherein the MG2 torque T2 is calculated by replacing the engine torque TE in the (expression 3) with the engine torque command value at the engine operating point with the vehicle required torque TC defined as torque "−To" in a direction opposite to the running torque To. This allows torque that makes up for any excess or deficiency in the torque transmitted from the engine E to the counter drive gear O with respect to the vehicle required torque TC to be generated in the second motor generator MG2. Further, the MG2 rotating speed N2 that is the rotating speed of the second motor generator MG2 is proportional to the vehicle speed at all times and therefore the MG2 rotating speed command value is automatically established in accordance with the vehicle speed detected by the vehicle speed sensor Se4. The MG2 rotating speed command value and the MG2 torque command value thus determined define the MG2 operating point. Note that, since the MG2 rotating speed command value is automatically established according to the vehicle speed as described above, the second motor generator MG2 is basically subject to torque control according to the MG2 torque command value of the MG2 operating point.

In addition, the control unit 10 performs the fluctuation offset control that controls the output torque of the second motor generator MG2 (MG2 torque T2) so as to offset torque fluctuations of the counter drive gear O as the output member caused by the fluctuations in the output torque of the first motor generator MG1 (MG1 torque T1). For such a control of the MG2 torque T2, the fluctuating torque correction section 14 performs operations for correcting the MG2 torque command value of the MG2 operating point established by the MG2 operating point determination section 13. Specifically, the fluctuating torque correction section 14 determines a correction value for correcting the MG2 torque command value and adds the correction value to the MG2 torque command value to thereby establish a new MG2 torque command value after the correction. Note herein that the fluctuations in the MG1 torque T1 occur when, for example, the engine rotating speed NE is increased to start the engine E using the torque of the first motor generator MG1 or the engine rotating speed NE is increased or decreased as required as the engine operating point is changed even during operation of the engine E.

To offset torque fluctuations of the counter drive gear O as a result of the fluctuations in the MG1 torque T1 being transmitted as described above, the fluctuating torque correction section 14 defines torque of the same magnitude as, and in the direction opposite to, the torque fluctuations of the counter drive gear O as the correction value. At this time, the correction value takes into account the gear ratio of the power transmission system from the second motor generator MG2 to the counter drive gear O and is calculated, for example, as a conversion torque (coaxial conversion torque) on the same axis, such as on the counter drive gear O or the wheel W. The fluctuating torque correction section 14 then adds the correction value obtained through the foregoing procedure to the MG2 torque command value established by the MG2 operating point determination section 13 to thereby correct the MG2 operating point. The control unit 10 controls the second motor generator MG2 according to the corrected MG2 operating point after the correction. The control unit 10 is thereby able to perform the fluctuation offset control that offsets torque fluctuations of the counter drive gear O caused by the fluctuations in the output torque of the first motor generator MG1, while outputting torque required for running the vehicle to the second motor generator MG2. Through the fluctuation offset control as described above, fluctuations in the driving force of the vehicle, not expected by the driver, occurring as a result of the fluctuations in the MG1 torque T1 being transmitted to the wheel W can be inhibited.

The low voltage state judgment section 15 performs operations for determining whether or not the battery B is in a low voltage state or a normal state based on the voltage (output voltage) of the battery B as the electric power supplier. In this embodiment, the low voltage state judgment section 15 makes a judgment using the value of a voltage detected by the battery state detection section 30 as the battery voltage. When the battery voltage is changed from the normal state to a value equal to, or lower than, a predetermined low voltage threshold value, the low voltage state judgment section 15 determines that the battery B is in the low voltage state. Alternatively, when the battery voltage is changed from the low voltage state to a value equal to, or higher than, a predetermined low voltage cancellation threshold value, the low voltage state judgment section 15 determines that the battery B is in the normal state. Note that, to allow for hysteresis, the low voltage cancellation threshold value is set to be greater than the low voltage threshold value (see FIG. 10). Specifically, once determining the low voltage state after the battery voltage becomes the predetermined low voltage threshold value or less, the low voltage state judgment section 15 determines the low voltage state until the battery voltage becomes equal to, or higher than, the low voltage cancellation threshold value that is set to be greater than the low voltage threshold value. At this time, the low voltage state judgment section 15 determines the low voltage state or the normal state by comparing the value of the battery voltage detected by the battery state detection section 30 with the low voltage threshold value and the low voltage cancellation threshold value. Note herein that the low voltage state judgment section 15 turns "ON" a low voltage flag when determining the low voltage state and turns "OFF" the low voltage flag when determining the normal state. The MG1 torque limiting section 16 and the MG2 torque limiting section 17 refer to this low voltage flag to recognize that the battery B is in the low voltage state or not.

Preferably, the low voltage threshold value is set to, for example, a lower limit value of a preset ordinary operating voltage range of the battery B that does not result in a shorter service life of the battery B, or a value close thereto. Alternatively, if the output torque of the first motor generator MG1 is large, it is preferable that the low voltage threshold value be set to, for example, a voltage value of the battery B that allows the fluctuation offset control of the second motor generator MG2 to be appropriately performed, when, for example, the engine rotating speed NE is to be increased with the torque of the first motor generator MG1 for starting the engine. In addition, preferably, the low voltage cancellation threshold value is set to a value that is different by a predetermined amount from the low voltage threshold value, so that the judgment made by the low voltage state judgment section 15 can be prevented from frequently changing between the low voltage state and the normal state. Note that the low voltage cancellation threshold value may be set to be the same as the low voltage threshold value to allow for no hysteresis.

If the low voltage state judgment section 15 determines that the battery B is in the low voltage state, the MG2 torque limiting section 17 performs operations for limiting the output torque of the second motor generator MG2. Herein, the MG2 torque limiting section 17 establishes a limit value of the output torque of the second motor generator MG2, i.e., an MG2 torque limit value that is a torque limit value restricting an upper limit of the MG2 torque command value of the MG2 operating point regardless of the decision made by the MG2 operating point determination section 13. In this embodiment, the MG2 torque limiting section 17 establishes the MG2 torque limit value such that the voltage of the battery B is greater than the low voltage threshold value. As described above, in this embodiment, the low voltage state judgment section 15 determines the normal state when the battery voltage becomes the predetermined low voltage cancellation threshold value or higher from the low voltage state. Consequently, the MG2 torque limiting section 17 establishes the MG2 torque limit value such that the battery voltage becomes equal to, or higher than, the low voltage cancellation threshold value that is set to a value greater than the low voltage threshold value.

Specifically, when the low voltage state is determined, the MG2 torque limiting section 17 defines a torque command value lower than the MG2 torque command value of the MG2 operating point at that particular point in time as the MG2 torque limit value. The battery voltage is thereafter detected and the MG2 torque limit value is gradually lowered until the battery voltage becomes equal to, or higher than, the low voltage cancellation threshold value. At this time, preferably, the MG2 torque limiting section 17 performs a feedback control that repeats, for example, at a very predetermined control cycle, an operation of defining a new value of the MG2 torque limit value reduced by a predetermined reduction value until the battery voltage becomes equal to, or higher than, the low voltage cancellation threshold value. Also preferably, the MG2 torque limiting section 17 derives a current value that the battery B can output to make the battery voltage equal to, or higher than, the low voltage cancellation threshold value based on the state of the battery B (the battery voltage and the amount of charge of the battery) detected by the battery state detection section 30, the MG1 rotating speed command value and the MG1 torque command value of the MG1 operating point established by the MG1 operating point determination section 12, and the MG2 rotating speed command value of the MG2 operating point defined according to the vehicle speed; the MG2 torque limiting section 17 thereby defines the upper limit of the MG2 torque command value derived from the current value as the MG2 torque limit value.

The control unit 10 limits the MG2 torque command value of the MG2 operating point with the MG2 torque limit value defined as described above as the upper limit. In other words, if the MG2 operating point determination section 13 defines an MG2 torque command value exceeding the MG2 torque limit value, the second motor generator MG2 is controlled with the MG2 torque limit value as the MG2 torque command value. Limiting the output torque of the second motor generator MG2 as described above allows the current used in the second motor generator MG2 to be limited, so that the voltage of the battery B can be prevented from dropping further and the battery voltage can be quickly restored to the normal state.

When the low voltage state judgment section 15 determines that the battery B is in the low voltage state, the MG1 torque limiting section 16 performs operations for limiting the output torque of the first motor generator MG1 in the positive direction. In other words, the MG1 torque limiting section 16 limits the MG1 torque T1 in the positive direction only, and not in the negative direction. In this embodiment, the MG1 torque limiting section 16 performs operations for limiting such that the first motor generator MG1 outputs torque in the negative direction only, with the MG1 torque T1 in the positive direction made to be zero. In other words, if the MG1 torque command value of the MG1 operating point established by the MG1 operating point determination section 12 is a positive value, the MG1 torque limiting section 16 makes an MG1 torque limit value zero so as to limit the MG1 torque command value to zero. In this case, the control unit 10 controls such that the first motor generator MG1 is freely rotatable. On the other hand, the MG1 torque limiting section 16 does not limit the MG1 torque command value, if the MG1 torque command value of the MG1 operating point established by the MG1 operating point determination section 12 is zero or a negative value. In this case, the control unit 10 controls the first motor generator MG1 in accordance with the MG1 operating point established by the MG1 operating point determination section 12.

In the hybrid drive system H, the first motor generator MG1 functions mainly as a generator. In other words, as shown in FIG. 3, in the hybrid drive mode during which the engine E is operating, the first motor generator MG1 outputs torque in the negative direction in order to receive the reaction force of the engine torque TE and transmit the engine torque TE to the ring gear r and the counter drive gear O. At this time, the first motor generator MG1 performs energy regeneration (generates electricity) to function as a generator if the MG1 rotating speed N1 is positive (rotating in the positive direction), and performs power running to function as a motor if the MG1 rotating speed N1 is negative (rotating in the negative direction). In either case, the first motor generator MG1 outputs torque in the negative direction. As shown in FIG. 4, in the EV drive mode in which the engine E remains stationary, the first motor generator MG1 is controlled such that the MG1 torque T1 is zero, and in a freely rotatable state.

Meanwhile, as shown in FIG. 5, when the engine E is started from a condition in which the vehicle (wheel W) is stationary, the first motor generator MG1 rotates in the positive direction (MG1 rotating speed N1 being positive), while outputting the MG1 torque T1 in the positive direction, and increases the rotating speed of the engine E via the planetary gear set PG to start the engine E. At this time, the second motor generator MG2 outputs the MG2 torque T2 in the positive direction corresponding to the reaction force opposing the MG1 torque T1 in the positive direction so as to offset torque fluctuations of the counter drive gear O caused by the fluctuations in the MG1 torque T1, thereby inhibiting fluctuations in the MG1 torque T1 from being transmitted to the wheel W. Further, as shown in FIG. 6, when the engine E is started from the EV drive mode, the first motor generator MG1 outputs the MG1 torque T1 in the positive direction to increase the rotating speed of the engine E via the planetary gear set PG, thereby starting the engine E. At this time, the first motor generator MG1 performs energy regeneration (generates electricity) when the MG1 rotating speed N1 is negative, but after the MG1 rotating speed N1 becomes positive, performs power running to consume the electric power of the battery B. At this time, the second motor generator MG2 outputs the MG2 torque T2 so as to offset torque fluctuations of the counter drive gear O caused by the fluctuations in the MG1 torque T1, thereby inhibiting fluctuations in the MG1 torque T1 from being transmitted to the wheel W. This MG2 torque T2 represents torque in the positive direction corresponding to the reaction force opposing the MG1 torque T1 in the positive direction, added to the MG2 torque command value of the MG2 operating point defined by the MG2 operating point determination section 13 in accordance with the vehicle required torque TC.

As described above, the first motor generator MG1 outputs torque in the positive direction basically only when the engine E is started as shown in FIGS. 5 and 6. The restriction imposed by the MG1 torque limiting section 16 on the MG1 torque T1 only in the positive direction therefore can inhibit the first motor generator MG1 from outputting a large torque for starting the engine E from the stationary state thereof. Unlike the case in which only the output torque of the second motor generator MG2 is limited, therefore, fluctuations in the driving force of the vehicle, not expected by the driver, occurring as a result of the fluctuations in a relatively large output torque of the first motor generator MG1 for engine starting being transmitted to the wheel W can be inhibited. Meanwhile, the MG1 torque limiting section 16 does not limit the output torque of the first motor generator MG1 in the negative direction. While the engine E is operating, therefore, power generation by the first motor generator MG1 is carried out and regeneration of electric power in the battery B is not inhibited as shown in FIG. 3. Consequently, further drop of the voltage of the battery B can be prevented, so that the battery voltage can be quickly restored to the normal state.

The control unit 10 limits the MG1 torque command value of the MG1 operating point established by the MG1 operating point determination section 12 and the MG2 torque command value of the MG2 operating point established by the MG2 operating point determination section 13 using the MG1 torque limit value and the MG2 torque limit value established by the MG1 torque limiting section 16 and the MG2 torque limiting section 17, respectively, as described above. This allows the control unit 10 to perform a torque limiting control that limits the output torque in the positive direction of the first motor generator MG1, while limiting the output torque of the second motor generator MG2, when the battery B runs into the predetermined low voltage state. This limits the current used by the first motor generator MG1 and the second motor generator MG2, thereby allowing the voltage of the battery B to recover.

Under normal circumstances, the control unit 10 performs a rate-of-change limiting control for the MG1 torque T1 and the MG2 torque T2. The rate-of-change limiting control inhibits fluctuations in the driving force of the vehicle, not expected by the driver, from occurring as a result of a sudden change in the MG1 torque T1 due to a change in the MG1 operating point and a sudden change in the MG2 torque T2 due to a change in the MG2 operating point being transmitted to the wheel W. The rate-of-change limiting control sets a limit such that the rate of change of the MG1 torque T1 and the MG2 torque T2 remains equal to, or lower than, a predetermined value and thereby changes the MG1 torque T1 and the MG2 torque T2 to respond to changes in the MG1 operating point and the MG2 operating point. The restriction imposed by the MG1 torque limiting section 16 on the MG1 torque T1 is, however, to limit the MG1 torque T1 in the positive direction for engine starting to zero. Such fluctuations in the MG1 torque T1, should they be transmitted to the wheel W, do not readily result in large fluctuations in the driving force. In this embodiment, therefore, the control unit 10 controls so as to allow, upon restrictions imposed by the MG1 torque limiting section 16 on the MG1 torque T1, the rate of change of the MG1 torque T1 to be greater than at timing at which limiting of the MG1 torque T1 is not executed; i.e., the control unit 10 controls to ease the limiting of the rate of change of the MG1 torque T1. Specifically, the control unit 10 performs the rate-of-change limiting control upon limiting of the MG1 torque T1, having a value that is greater than the limit value of the rate of change in the rate-of-change limiting control of the MG1 torque T1 and the MG2 torque T2 under normal circumstances as described above set as the limit value. The limiting of the MG1 torque T1 is thereby executed quickly, so that further dropping of the voltage of the battery B can be inhibited effectively.

1-5. Control Method of the Hybrid Drive System

Figure 8:
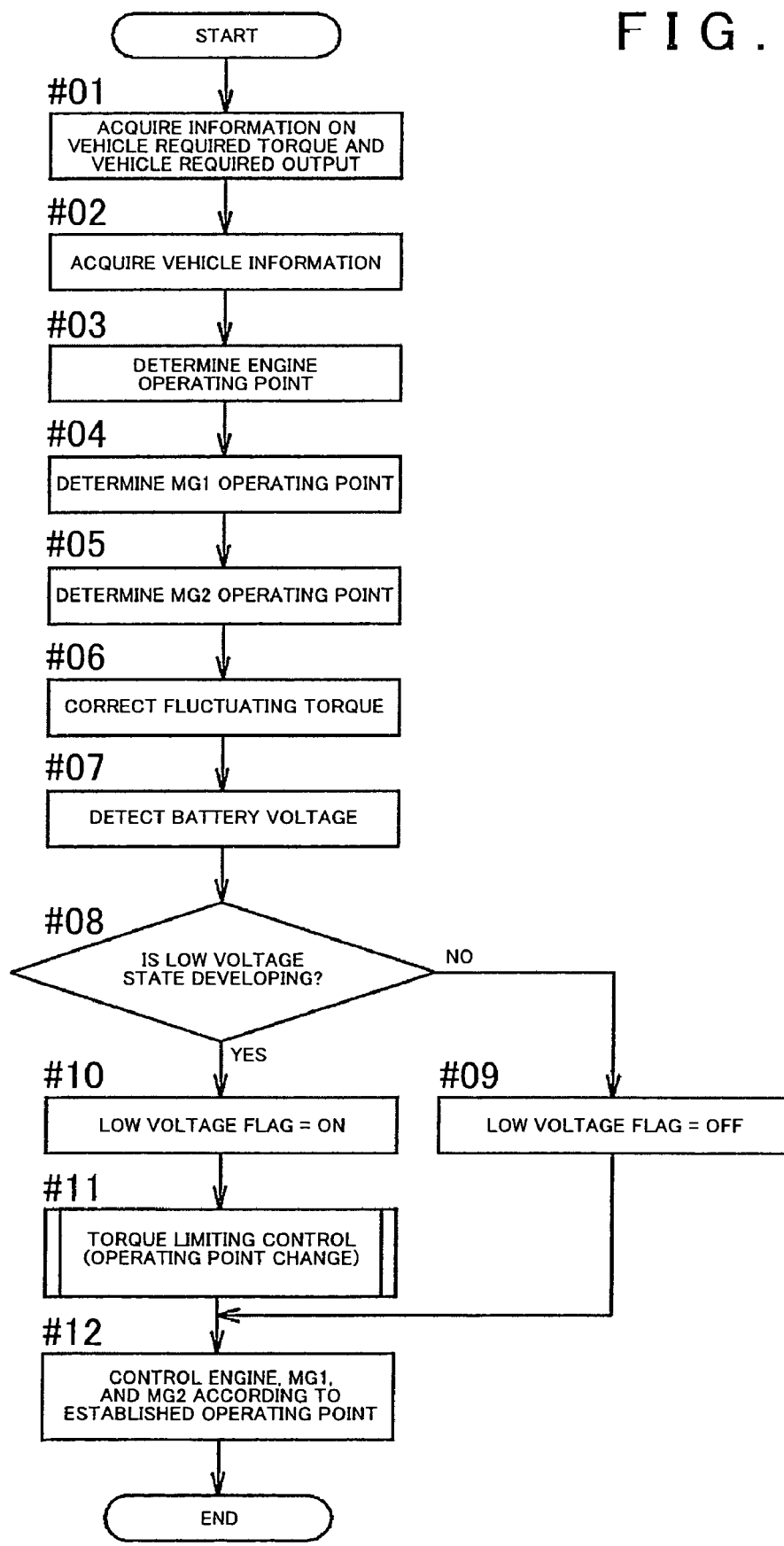
FIG. 8 is a flowchart showing an entire procedure of a control method of the hybrid drive system.
Figure 9:
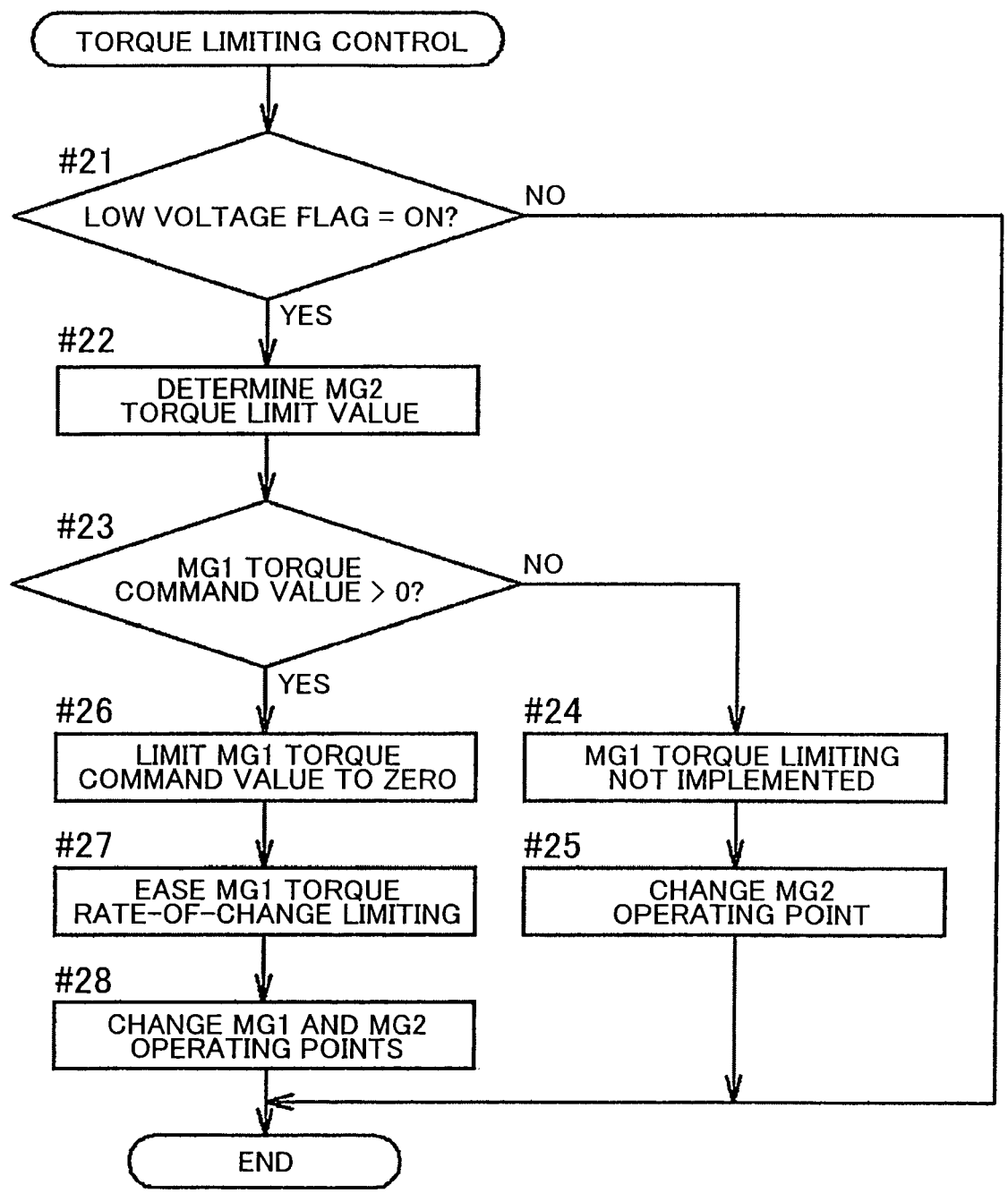
FIG. 9 is a flowchart showing a torque limiting control procedure relating to step #11 of FIG. 8.

A control method of the hybrid drive system H according to this embodiment will be described below based on flowcharts of FIGS. 8 and 9 and timing charts of FIG. 10. FIG. 8 is the flowchart showing an entire procedure of the control method of the hybrid drive system H according to this embodiment. FIG. 9 is the flowchart showing a torque limiting control procedure relating to step #11 of FIG. 8. Control operations of the hybrid drive system H are executed by the hardware or software (programs), or both, constituting each of the functional sections 11 to 17 of the control unit 10. If programs constitute each of the functional sections, the arithmetic processing unit included in the control unit 10 operates as a computer executing the programs constituting each of the functional sections. The control method of the hybrid drive system H will first be described with reference to the flowchart.

The control unit 10 first acquires information on the vehicle required torque TC and the vehicle required output PC inputted from the vehicle side (step #01). The control unit 10 also acquires vehicle speed information detected by the vehicle speed sensor Se4 (step #02). The control unit 10 thereafter has the engine operating point determination section 11 determine the engine operating point (step #03). In addition, the control unit 10 has the MG1 operating point determination section 12 establish the MG1 operating point (step #04) and the MG2 operating point determination section 13 establish the MG2 operating point (step #05). The methods for determining the engine operating point, the MG1 operating point, and the MG2 operating point have already been described and will not be reiterated here. The control unit 10 next has the fluctuating torque correction section 14 correct the MG2 torque T2 so as to offset torque fluctuations of the counter drive gear O caused by fluctuations in the MG1 torque T1 (step #06).

The battery state detection section 30 is next used to detect the voltage of the battery B (step #07). The control unit 10 then has the low voltage state judgment section 15 determine whether the battery B is in the low voltage state or not based on the battery voltage detected in the step #07 (step #08). If the battery B is not in the low voltage state (step #08: No), the control unit 10 turns "OFF" the low voltage flag to indicate that the battery B is in the normal state, not the low voltage state (step #09). Then, the control unit 10 controls the engine E, the first motor generator MG1, the second motor generator MG2 in accordance with the engine operating point determined in step #03, the MG1 operating point determined in step #04, and the MG2 operating point determined in step #05 (step #12).

If the battery B is in the low voltage state (step #08: Yes), on the other hand, the control unit 10 turns "ON" the low voltage flag to indicate that the battery B is in the low voltage state (step #10). The control unit 10 then has the MG1 torque limiting section 16 and the MG2 torque limiting section 17 perform the torque limiting control (step #11). The torque limiting control is to, as described earlier, limit the MG1 torque command value and the MG2 torque command value using the MG1 torque limit value and the MG2 torque limit value established by the MG1 torque limiting section 16 and the MG2 torque limiting section 17, respectively. The torque limiting control thereby controls to change the MG1 operating point established by the MG1 operating point determination section 12 and the MG2 operating point established by the MG2 operating point determination section 13. The torque limiting control will be described in detail below based on the flowchart of FIG. 9. The control unit 10 then controls the engine E, the first motor generator MG1, and the second motor generator MG2 (step #12) in accordance with the engine operating point determined in step #03, the MG1 operating point determined in step #04 and thereafter changed in step #11, and the MG2 operating point determined in step #05 and thereafter changed in step #11. This completes the control operations performed by the hybrid drive system H.

The torque limiting control procedure relating to step #11 will next be described below. When it is determined that the battery B is in the low voltage state (step #08: Yes) as a result of the determination made as to whether the battery B is in the low voltage state or not in step #08 and accordingly the low voltage flag is turned "ON" (step #21: Yes), the control unit 10 first has the MG2 torque limiting section 17 establish the MG2 torque limit value (step #22). The method for establishing the MG2 torque limit value has already been described and will not be reiterated here.

The control unit 10 then determines whether the MG1 torque command value of the MG1 operating point established in step #04 is positive (>0) or not (step #23). If it is determined, as a result of this determination, that the MG1 torque command value is not positive; i.e., the MG1 torque command value is zero or negative ($\leq 0$) (step #23: No), limiting of the MG1 torque T1 by the MG1 torque limiting section 16 is not implemented (step #24). Accordingly, the control unit 10 changes the MG2 operating point established in step #05 according to the MG2 torque limit value established in step #22 (step #25). If the MG1 torque command value is positive (>0) (step #23: Yes), on the other hand, the MG1 torque limiting section 16 is used to limit the MG1 torque command value to zero (step #26). In addition, the control unit 10 performs the control of easing the limiting of the rate of change of the MG1 torque T1 (step #27). The control unit 10 then changes the MG1 operating point established in step #04 and the MG2 operating point established in step #05 according to the MG2 torque limit value established in step #22 and the MG1 torque limit value (=0) established in step #25 (step #28). This completes the torque limiting control relating to step #11.

The timing chart shown in FIG. 10 will be described next. FIG. 10 is a timing chart showing a typical MG1 torque T1 limiting control when the battery B runs into the low voltage state. FIG. 10 shows in sequence from top downward: values of the "battery voltage" detected by the battery state detection section 30; ON or OFF state of the "low voltage flag" indicating the result of judgment made by the low voltage state judgment section 15; the "MG1 torque command value" established by the control unit 10; whether the "MG1 torque limiting" by the MG1 torque limiting section 16 is implemented or not; and the "engine rotating speed". Note that FIG. 10 omits the timing chart indicating the MG2 torque command value; however, the MG2 torque T2 is also limited as described above when the battery B runs into the low voltage state (the low voltage flag is ON).

Figure 10:
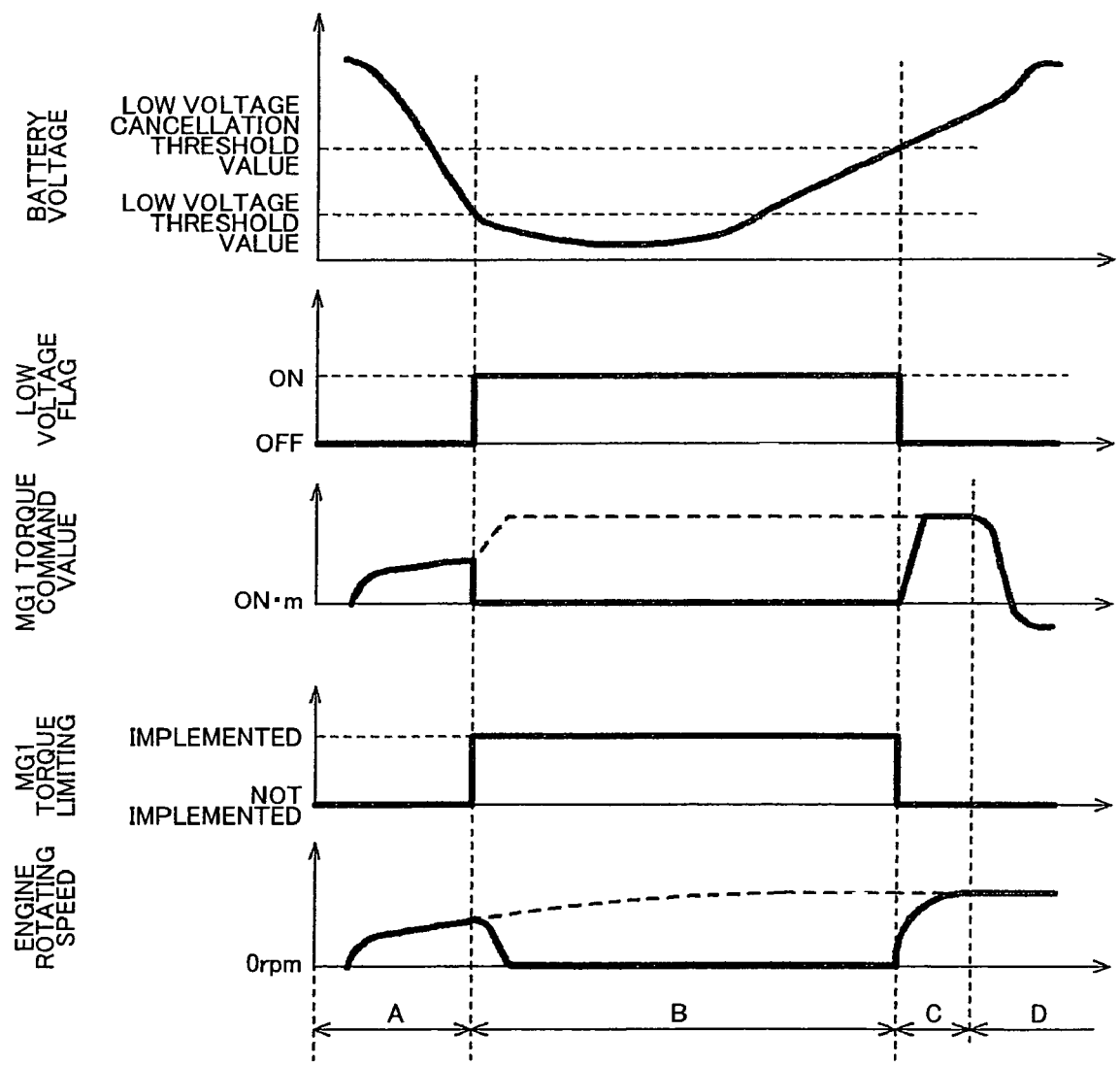
FIG. 10 is a timing chart showing a typical torque limiting control.

In a range A of FIG. 10, the MG1 torque command value is positive to start the engine E and the rotating speed of the engine E is increased by the MG1 torque T1 in the positive direction. The battery voltage is, however, decreased suddenly because of the first motor generator MG1 being made to perform power running for outputting the MG1 torque T1 in the positive direction. Such a phenomenon tends to occur when, for example, the battery B is unable to exhibit its performance fully for an extremely low temperature involved therewith. If the battery voltage becomes equal to, or lower than, the low voltage threshold value before the engine E starts (complete explosion), the low voltage state judgment section 15 determines that the battery B is in the low voltage state as shown in a range B, so that the "low voltage flag" is turned ON from the OFF state. Herein, the MG1 torque command value is positive and, if it is determined that the battery B is in the low voltage state, the MG1 torque limiting section 16 limits the MG1 torque T1 (MG1 torque limiting implemented). In other words, the MG1 torque limiting section 16 limits the MG1 torque T1 to zero (0 [N·m]) in order to limit the output torque of the first motor generator MG1 in the positive direction. This causes the first motor generator MG1 to stop rotating, so that the engine rotating speed NE becomes zero (0 [rpm]). At this time, the control unit 10 performs the control of easing the limiting of the rate of change of the MG1 torque T1 so as to permit the rate of change to be greater than in the normal state. As a result, the MG1 torque T1 changes rapidly, so that the MG1 torque command value quickly changes to zero within a short period of time. In addition, the MG2 torque limiting section 17 also limits the MG2 torque T2, which is not, however, shown in FIG. 10. Note that the broken lines shown across the range B to a range C indicate the MG1 torque command value and the engine rotating speed NE, respectively, when the limiting of the MG1 torque T1 is not implemented.

By limiting the MG1 torque T1 and the MG2 torque T2 in the positive direction as described above, the current used by the first motor generator MG1 and the second motor generator MG2 is limited, so that the battery voltage gradually recovers in the range B. When the battery voltage becomes equal to, or higher than, the low voltage cancellation threshold value, the low voltage state judgment section 15 determines that the battery B is in the normal state and the "low voltage flag" turns OFF from the ON state as indicated in the range C. This cancels the limiting of the MG1 torque T1 by the MG1 torque limiting section 16 (MG1 torque limiting not implemented). The control unit 10 therefore establishes the MG1 torque command value in the positive direction in order to start the engine E according to the MG1 operating point established by the MG1 operating point determination section 12. At this time, the control unit 10 performs the control of limiting the rate of change such that the rate of change of the MG1 torque T1 becomes equal to, or less than, a predetermined limit value. As a result, the MG1 torque T1 changes (increases) to the MG1 torque command value of the MG1 operating point at a rate of change equal to, or lower than, the predetermined rate of change. This makes the MG1 torque T1 positive, so that the first motor generator MG1 rotates in the positive direction to increase the engine rotating speed NE. When the engine E then reaches a predetermined engine startable speed or higher, the fuel supply and ignition for the engine E is started to start the engine E. When the engine E starts and runs at a steady idle speed, the control unit 10 changes the MG1 torque command value to negative. The first motor generator MG1 is then set into a state of outputting the MG2 torque T2 in the negative direction to generate power (energy regeneration), while rotating in the positive direction (MG1 rotating speed N1 being positive).

As described above, the control unit 10 limits the output torque of the second motor generator MG2 and performs the torque limiting control limiting the output torque of the first motor generator MG1 in the positive direction, when the battery B runs into the low voltage state; however, the control unit 10 cancels the torque limiting control if the battery B recovers from the low voltage state. If the engine E remains in the stationary state at this time, the first motor generator MG1 is made to output torque in the positive direction to rotatably drive the engine E (input shaft I), so that the engine E is started.

2. Second Embodiment

A second embodiment of the present invention will be described next. A hybrid drive system H according to this embodiment differs from the first embodiment in that control is provided that cancels the limiting of the output torque of the first motor generator MG1 in the positive direction in the torque limiting control when the counter drive gear O as the output member is fixed. In other words, the MG1 torque T1 is not transmitted to the side of the wheel W from the counter drive gear O when the counter drive gear O is fixed. Even if the first motor generator MG1 outputs torque in the positive direction for, for example, starting the engine, there is no likelihood that the output torque will be transmitted to the wheel W, causing fluctuations in the driving force of the vehicle, not expected by the driver, to occur. Further, the electric power required for driving the first motor generator MG1 at this time is smaller than that required for driving the second motor generator MG2. There is therefore only a small amount of battery voltage decreased, so that the battery voltage can be quickly restored to the normal state by having the first motor generator MG1 generate power with the engine torque TE after the engine is started. This embodiment is, therefore, arranged so as to, upon the torque limiting control, permit quick starting of the engine E by canceling the limiting of the output torque in the positive direction of the first motor generator MG1 when the counter drive gear O is fixed. Note that other arrangements than the above may be the same as those of the first embodiment.

Figure 11:
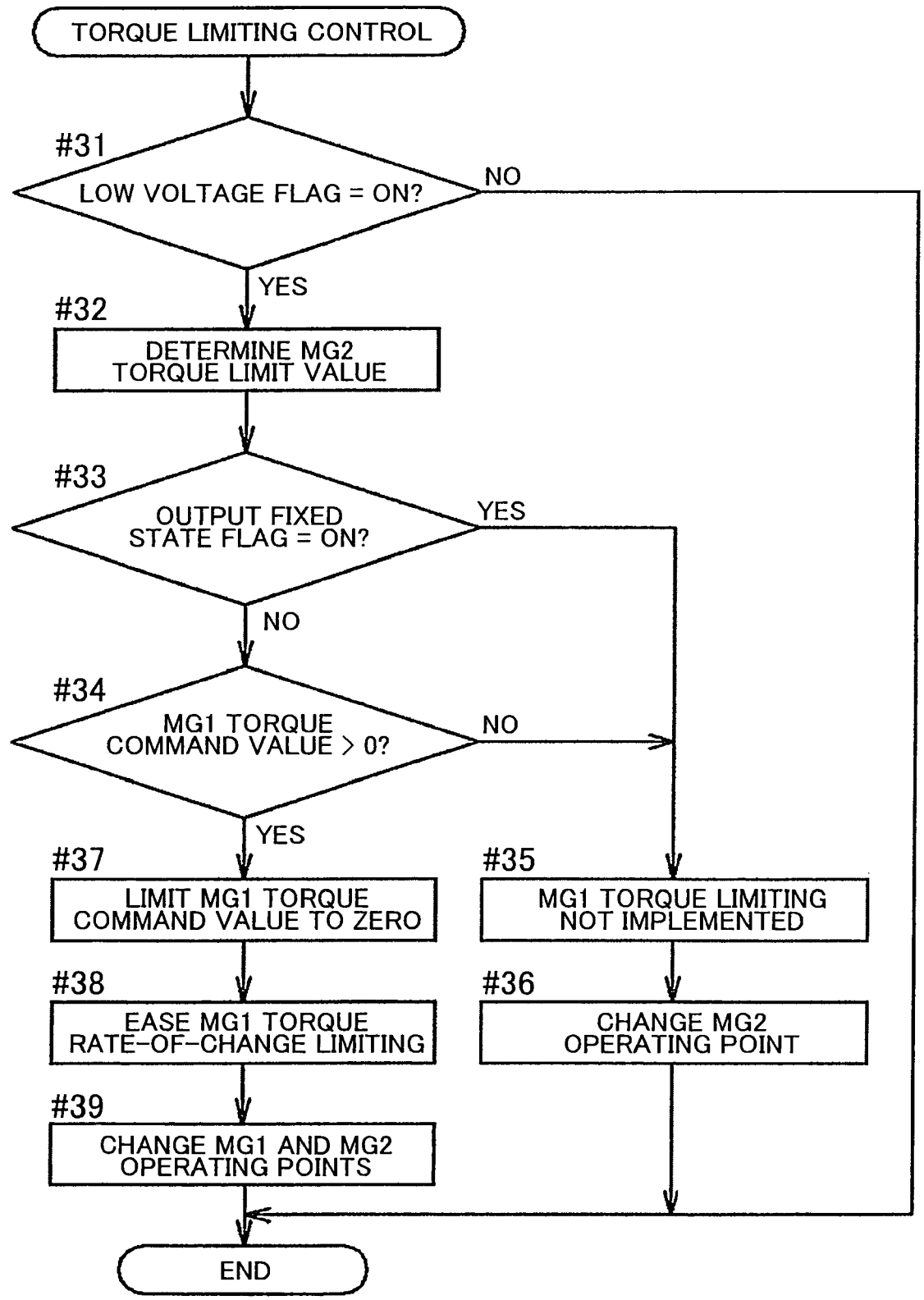
FIG. 11 is a flowchart showing a torque limiting control procedure according to a second embodiment of the present invention.
Figure 12:
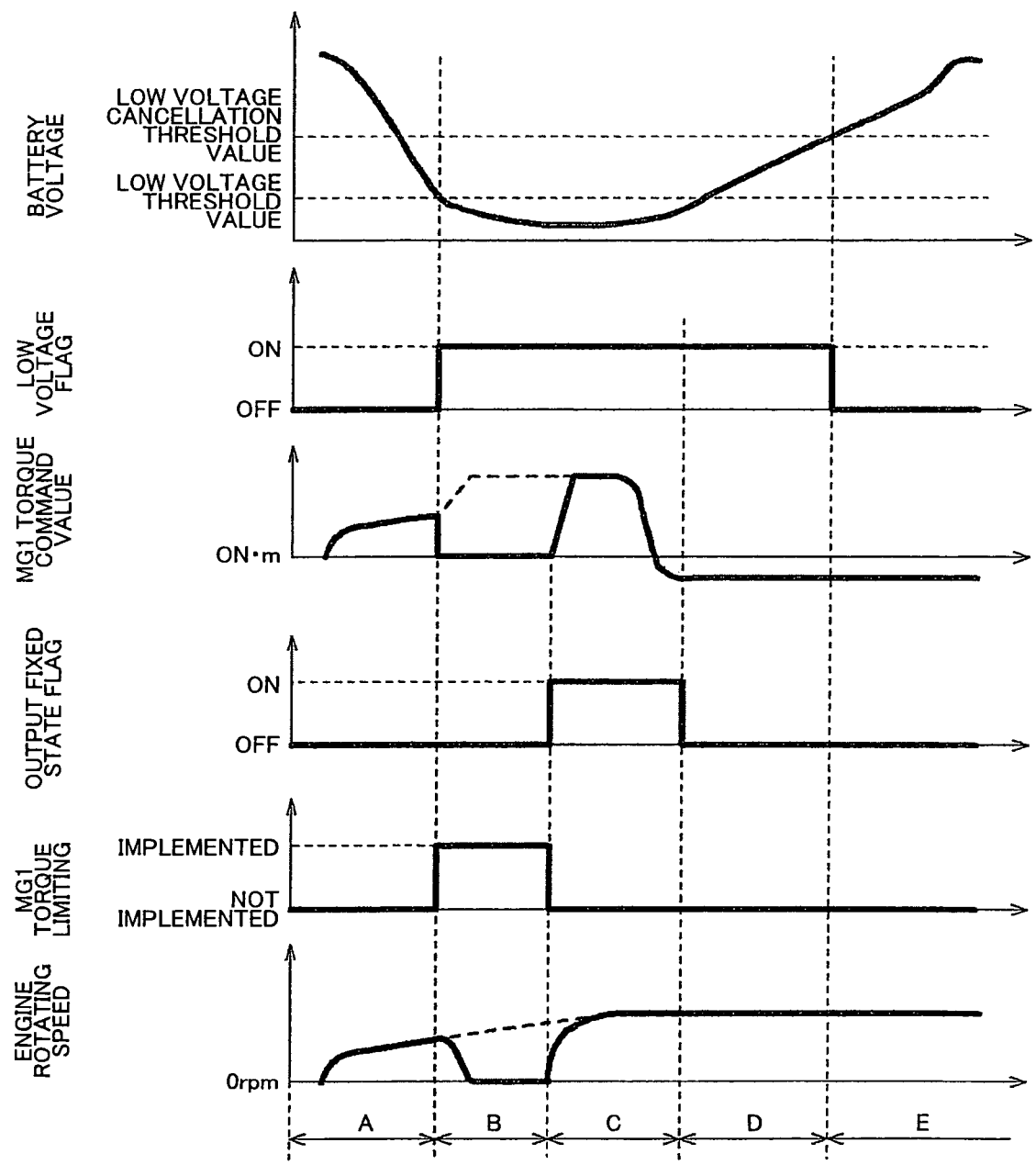
FIG. 12 is a timing chart showing a typical torque limiting control according to the second embodiment.

The hybrid drive system H according to this embodiment will be described below with reference to FIGS. 11 and 12 with particular emphasis on the differences from the first embodiment. FIG. 11 is a flowchart corresponding to FIG. 9 in the first embodiment, showing a torque limiting control procedure relating to step #11 of FIG. 8. The entire procedures for controlling the hybrid drive system H are the same as those shown in FIG. 8 and explanation thereof will be omitted. Further, FIG. 12 is a timing chart corresponding to FIG. 10 in the first embodiment, showing a typical MG1 torque T1 limiting control when the battery B runs into the low voltage state.

The hybrid drive system H includes an output fixed state judgment unit for determining whether the counter drive gear O as the output member is fixed or not. Preferably, the output fixed state judgment unit is included in the control unit 10 (see FIG. 2), though not shown in FIG. 2. In this embodiment, each of rotating elements that makes up the power transmission system from the counter drive gear O to the wheel W is connected (drivingly coupled) through a gearing, without having an engagement unit, such as a clutch, interposed therein. Accordingly, all rotating elements constituting the power transmission system from the counter drive gear O to the wheel W rotate at a rotating speed proportional to a rotating speed of the counter drive gear O. If, therefore, any of the rotating elements constituting the power transmission system from the counter drive gear O to the wheel W is fixed so as to stop rotating, the counter drive gear O is also fixed. In this embodiment, therefore, the output fixed state judgment unit defines any one or more of the rotating elements (including the counter drive gear O and the wheel W) constituting the power transmission system from the counter drive gear O to the wheel W as an output rotating element of the hybrid drive system H to thereby determine whether or not the output rotating element is fixed so as to stop rotating. If determining that the output rotating element is fixed, the output fixed state judgment unit turns ON an output fixed state flag; if determining that the output rotating element is not fixed, the output fixed state judgment unit turns OFF the output fixed state flag.

Cases where the output fixed state judgment unit determines that the output rotating element is fixed include, for example, a "P" range is selected with the select lever of the automatic transmission and any of the rotating elements from the counter drive gear O to the wheel W is fixed by a parking lock mechanism. In addition to this, other possible cases include, for example, the wheel W is fixed so as not to be rotatable by the parking brake and the wheel W is fixed so as not to be rotatable by the service brake. Information of various types indicating vehicle conditions used for the determination made by the output fixed state judgment unit is inputted to the control unit 10 as the vehicle information IC as shown in FIG. 2.

A control method of the hybrid drive system H will be described below. In this embodiment, too, the entire procedure of the control method is the same as the flowchart shown in FIG. 8 according to the first embodiment and explanation thereof will be omitted here. A torque limiting control procedure will only be described. The torque limiting control procedure according to this embodiment is substantially the same as that of the first embodiment, except that the judgment of step #33 is added. In other words, when it is determined that the battery B is in the low voltage state (step #08: Yes) as a result of the determination made as to whether the battery B is in the low voltage state or not in step #08 of FIG. 8 and accordingly the low voltage flag is turned "ON" (step #31: Yes), the control unit 10 has the MG2 torque limiting section 17 establish the MG2 torque limit value (step #32).

The control unit 10 next determines whether the output fixed state flag is "ON" or not (step #33). The output fixed state flag is such that, as described earlier, the output fixed state judgment unit determines whether any one or more of the rotating elements constituting the power transmission system from the counter drive gear O to the wheel W as the output rotating element is fixed or not. If the same is fixed, the output fixed state judgment unit turns "ON" the output fixed state flag; if determining that the same is not fixed, the output fixed state judgment unit turns "OFF" the output fixed state flag. The control unit 10 therefore refers to the output fixed state flag to recognize whether the output rotating element is fixed or not in step #33. If the output fixed state flag is "ON" (step #33: Yes), the limiting of the MG1 torque T1 by the MG1 torque limiting section 16 is not implemented (step #35). If the output fixed state flag is "ON", therefore, the control unit 10 outputs the MG1 torque T1 in the positive direction as necessary to start the engine E even if the battery B is in the low voltage state. Accordingly, this enables quick engine starting, while preventing the fluctuations in the vehicle driving force not expected by the driver from occurring. The control unit 10 thereafter changes the MG2 operating point established in step #05 of FIG. 8 in accordance with the MG2 torque limit value established in step #32 (step #36).

If, on the other hand, the output fixed state flag is not "ON" (step #33: No), i.e., if the output fixed state flag is "OFF", the control unit 10 determines whether the MG1 torque command value of the MG1 operating point established in step #04 of FIG. 8 is positive (>0) or not (step #34). If, as a result of this determination, the MG1 torque command value is not positive, i.e., the MG1 torque command value is zero or negative (≦0) (step #34: No), the limiting of the MG1 torque T1 by the MG1 torque limiting section 16 is not implemented (step #35). Accordingly, the control unit 10 changes the MG2 operating point established in step #05 of FIG. 8 according to the MG2 torque limit value established in step #32 (step #36). If the MG1 torque command value is positive (>0) (step #34: Yes), on the other hand, the MG1 torque limiting section 16 is used to limit the MG1 torque command value to zero (step #37). In addition, the control unit 10 performs the control of easing the limiting of the rate of change of the MG1 torque T1 (step #38). The control unit 10 then changes the MG1 operating point established in step #04 of FIG. 8 and the MG2 operating point established in step #05 according to the MG2 torque limit value established in step #32 and the MG1 torque limit value (=0) established in step #37 (step #39). This completes the torque limiting control according to this embodiment.

The timing chart shown in FIG. 12 will be described next. FIG. 12 is a timing chart showing a typical MG1 torque T1 limiting control when the battery B runs into the low voltage state. FIG. 12 shows, in addition to the similar timing charts to those shown in FIG. 10 according to the first embodiment, a timing chart indicating the ON or OFF state of the "output fixed state flag" that shows the result of determination made by the output fixed state judgment unit.

In a range A of FIG. 12, the MG1 torque command value is positive to start the engine E and the rotating speed of the engine E is increased by the MG1 torque T1 in the positive direction. The battery voltage is, however, decreased suddenly because of the first motor generator MG1 being made to perform power running for outputting the MG1 torque T1 in the positive direction. If the battery voltage becomes equal to, or lower than, the low voltage threshold value before the engine E starts (complete explosion), the low voltage state judgment section 15 determines that the battery B is in the low voltage state as shown in a range B, so that the "low voltage flag" is turned ON from the OFF state. Herein, the MG1 torque command value is positive and, if it is determined that the battery B is in the low voltage state, the MG1 torque limiting section 16 limits the MG1 torque T1 (MG1 torque limiting implemented). In other words, the MG1 torque limiting section 16 limits the MG1 torque T1 to zero (0 [N·m]) in order to limit the output torque of the first motor generator MG1 in the positive direction. This causes the first motor generator MG1 to stop rotating, so that the engine rotating speed NE becomes zero (0 [rpm]). At this time, the control unit 10 performs the control of easing the limiting of the rate of change of the MG1 torque T1 so as to permit the rate of change to be greater than in the normal state. As a result, the MG1 torque T1 changes rapidly, so that the MG1 torque command value quickly changes to zero within a short period of time. In addition, the MG2 torque limiting section 17 also limits the MG2 torque T2, which is not, however, shown in FIG. 12. Note that the broken lines shown across the range B to a range C indicate the MG1 torque command value and the engine rotating speed NE, respectively, when the limiting of the MG1 torque T1 is not implemented.

When the output fixed state judgment unit thereafter determines that the output rotating element is fixed and the output fixed state flag changes to the "ON" state from the "OFF" state, the limiting of the MG1 torque T1 by the MG1 torque limiting section 16 is canceled (MG1 torque limiting not implemented) as shown in the range C. The control unit 10 therefore establishes the MG1 torque command value in the positive direction in order to start the engine E according to the MG1 operating point established by the MG1 operating point determination section 12. At this time, the control unit 10 performs the control of limiting the rate of change such that the rate of change of the MG1 torque T1 becomes equal to, or less than, a predetermined limit value. As a result, the MG1 torque T1 changes (increases) to the MG1 torque command value of the MG1 operating point at a rate of change equal to, or lower than, the predetermined rate of change. This makes the MG1 torque T1 positive, so that the first motor generator MG1 rotates in the positive direction to increase the engine rotating speed NE. When the engine E then reaches a predetermined engine startable speed or higher, the fuel supply and ignition for the engine E is started to start the engine E. When the engine E starts and runs at a steady idle speed, the control unit 10 changes the MG1 torque command value to negative. The first motor generator MG1 is then set into a state of outputting the MG1 torque T1 in the negative direction to generate power (energy regeneration), while rotating in the positive direction (MG1 rotating speed N1 being positive).

After the engine E is started, the MG1 torque command value remains negative even when the output fixed state flag turns "OFF" with the "low voltage flag" turned "ON" and no limiting of the MG1 torque T1 by the MG1 torque limiting section 16 is implemented (MG1 torque limiting not implemented) as shown in a range D. The first motor generator MG1 therefore continues generating electricity, so that the voltage of the battery B can be quickly recovered. In addition, in this embodiment, when the "low voltage flag" is ON, the MG2 torque T2 is limited. This limits the current used by the second motor generator MG2, so that the voltage of the battery B can be recovered even more quickly. When the battery voltage becomes equal to, or higher than, the low voltage cancellation threshold value, the low voltage state judgment section 15 determines that the battery B is in the normal state and the "low voltage flag" changes to the OFF state from the ON state as indicated in a range E. When the "low voltage flag" is OFF, the limiting of the MG2 torque T2 is canceled. The control unit 10 therefore controls the second motor generator MG2 according to the MG2 operating point established by the MG2 operating point determination section 13.

3. Other Embodiments (1) The above embodiments have been described for an exemplary case, in which the differential gearing is the single pinion type planetary gear mechanism including, as three rotating elements, the sun gear s, the carrier ca, and the ring gear r. This is not, however, the only possible arrangement for the differential gearing according to an embodiment of the present invention. It is therefore preferable that, for example, the differential gearing is structured to include another differential gear mechanism, such as a double pinion type planetary gear mechanism or a differential gear mechanism incorporating a plurality of bevel gears meshing with each other. Further, the differential gearing is not limited to the arrangement having three rotating elements; rather, it is preferable that the differential gearing be structured to include four or more rotating elements. In this case, too, three rotating elements selected from the four or more rotating elements are to be designated as a first rotating element, a second rotating element, and a third rotating element in the order of the rotating speed; and a first rotating electric machine is connected to the first rotating element, an input member is connected to the second rotating element, and an output member and a second rotating electric machine are connected to the third rotating element. Note that, for the differential gearing having four or more rotating elements, an arrangement may, for example, be used in which part of rotating elements of two or more sets of planetary gear mechanisms are connected with each other.

(2) The above embodiments have been described for an exemplary case, in which both the output member and the second rotating electric machine are connected to the third rotating element of the differential gearing. This is not, however, the only possible embodiment of the present invention. Another preferable embodiment of the present invention is therefore such that, for example, in a differential gearing having four or more rotating elements, one of the output member and the second rotating electric machine is connected to the third rotating element and the other of the output member and the second rotating electric machine is connected to another rotating element. As such an arrangement, it is, for example, preferable that the differential gearing include at least four rotating elements of a first rotating element, a second rotating element, a third rotating element, and a fourth rotating element in the order of the rotating speed; and a first rotating electric machine be connected to the first rotating element, an input member be connected to the second rotating element, an output member be connected to the third rotating element, and a second rotating electric machine be connected to the fourth rotating element.

(3) The above embodiments have been described for an exemplary case, in which, when it is determined that the battery B as the electric power supplier is in the low voltage state, the MG2 torque limiting section 17 of the control unit 10 establishes the MG2 torque limit value such that the voltage of the battery B becomes greater than the low voltage threshold value. This is not, however, the only possible embodiment of the present invention. Another preferable embodiment of the present invention is therefore, for example, to limit the MG2 torque limit value to zero when the battery B is determined to be in the low voltage state.

(4) The above embodiments have been described for an exemplary case, in which the control unit 10 performs the rate-of-change limiting control that limits the rate of change of the MG1 torque T1 and the MG2 torque T2 when in the normal state, and performs the control of easing the limiting of the rate of change of the MG1 torque T1 only upon limiting of the MG1 torque T1 by the MG1 torque limiting section 16. This is not, however, the only possible embodiment of the present invention. Another preferable embodiment of the present invention is therefore such that, for example, the control of easing the limiting of the rate of change of the MG2 torque T2 is performed also upon limiting of the MG2 torque T2 by the MG2 torque limiting section 17, or the control of easing the limiting of the rate of change of the MG2 torque T2 is performed only upon limiting of the MG2 torque T2 by the MG2 torque limiting section 17; or alternatively, the control of limiting the rate-of-change is performed to limit the rate of change of the MG1 torque T1 and the MG2 torque T2 using the limit value of the same rate of change in all cases.

(5) The above embodiments have been described for an exemplary case of the hybrid drive system H, in which, as shown in FIG. 1, the counter drive gear O as the output member that is integrally rotatable with the third rotating element (the ring gear r of the planetary gear set PG) of the differential gearing is connected to the wheel W via the counter gearing C and the output differential gearing D and the second motor generator MG2 is connected to the counter drive gear O and the output differential gearing D via the counter gearing C. The hybrid drive system H having the arrangements as described above is well adapted for use in, for example, an FF vehicle, an MR vehicle, or a RR vehicle, because the system can be arranged to extend over a short distance in the direction of the input shaft I connected to the engine E. The mechanical arrangement of the hybrid drive system H according to the above embodiments is, however, only a typical example and, understandably, the present invention is applicable to the hybrid drive system H having a different mechanical arrangement. The present invention is therefore applicable, for example, to a hybrid drive system having an arrangement well adapted to an FR vehicle having the input shaft I connected to the engine E, the first motor generator MG1, the planetary gear set PG as the differential gearing, and the second motor generator MG2 disposed coaxially with each other.

Some aspects of the present invention can be well adapted for use in a drive system for a hybrid vehicle having an engine, a first rotating electric machine, and a second rotating electric machine as drive power sources.

Note that, in the present application, "connection" is used to include, in addition to a structure that directly transmits rotation, one that transmits rotation indirectly via one or two or more members. Further, in the present application, "rotating electric machine" is used to include concepts of a motor, a generator, and a motor generator that achieves the function of the motor and the generator as necessary. In addition, in the present application, "positive direction" indicates that the direction in which rotation or torque is transmitted to any of the rotating elements of the differential gearing is the same as the output direction of rotation or torque of the engine, and "negative direction" is opposite thereto.

According to an exemplary aspect of the invention, the first rotating electric machine functions mainly as a generator. Specifically, while the engine is operating, the first rotating electric machine outputs torque in the negative direction in order to receive a reaction force of an engine torque and transmit the engine torque to the output member. Basically, the first rotating electric machine outputs torque in the positive direction only during engine starting. According to this arrangement, limiting the output torque of the second rotating electric machine when the electric power supplier runs into the predetermined low voltage state regardless of whether the engine is in an operating state or a stationary state allows the current used in the second rotating electric machine to be limited, thereby enabling the voltage of the electric power supplier to restore to its normal state. Further, in this case, liming the output torque of the first rotating electric machine in the positive direction helps inhibit the first rotating electric machine from outputting a large torque in order to start the engine from its stationary state. Unlike the case in which only the output torque of the second rotating electric machine is limited, therefore, fluctuations in a driving force of the vehicle, not expected by the driver, occurring as a result of the output torque of the first rotating electric machine for starting the engine being transmitted to the wheel can be inhibited. In addition, since the output torque in the negative direction of the first rotating electric machine is not limited at this time, electric power generation by the first rotating electric machine can be done if the engine is operating, so that regeneration of electric power in the electric power supplier can be achieved. Consequently, the voltage of the electric power supplier can be quickly restored to the normal state.

According to an exemplary aspect of the invention, by making the output torque of the first rotating electric machine in the positive direction zero as described above, the first rotating electric machine can be prevented from outputting torque not sufficient to start the engine. This zeros the current used in the first rotating electric machine, so that the voltage of the electric power supplier can be more quickly restored to the normal state. In addition, since the first rotating electric machine outputs the torque in the negative direction only at this time, the first rotating electric machine generates electric power if the engine is operating, so that regeneration of electric power in the electric power supplier can be achieved.

According to an exemplary aspect of the invention, when the output member is fixed so as not to be rotatable, there is no likelihood that the output torque of the first rotating electric machine will be transmitted to any point on the side of the wheel further than the output member. Even if the first rotating electric machine outputs torque in the positive direction, for example, for starting the engine, therefore, there is no likelihood that the output torque will be transmitted to the wheel, causing fluctuations in the driving force of the vehicle, not expected by the driver, to occur. In accordance with this arrangement, therefore, the engine can be quickly started, while preventing the fluctuations in the driving force of the vehicle not expected by the driver from occurring. Once the engine is started, the first rotating electric machine can be made to generate electric power to let the electric power be regenerated in the electric power supplier, so that the voltage of the electric power supplier can be more quickly restored to the normal state.

According to an exemplary aspect of the invention, the torque limiting control can be started when the output voltage of the electric power supplier becomes equal to, or lower than, the predetermined low voltage threshold value. This can inhibit such problems from occurring as that, in which the output voltage of the electric power supplier significantly decreases and it becomes difficult for the vehicle to run appropriately, or the service life of the electric power supplier becomes shorter.

According to an exemplary aspect of the invention, the second rotating electric machine can be made to output torque for assisting the driving force for letting the vehicle run to the extent that the output voltage of the electric power supplier can be recovered to a level of being greater than the low voltage threshold value.

According to an exemplary aspect of the invention, the limiting of the output torque of the first rotating electric machine in the positive direction is canceled when the electric power supplier recovers from the low voltage state to the normal state. The output torque of the first rotating electric machine in the positive direction can therefore be transmitted to the differential gearing via the input member, thereby starting the engine.

According to an exemplary aspect of the invention, the output torque of the first rotating electric machine is allowed to change at a large rate of change upon the torque limiting control, which enables quick execution of the torque limiting control. Further reduction in the voltage of the electric power supplier can therefore be effectively inhibited. At any timing other than the execution of the torque limiting control, on the other hand, the rate of change in the output torque of the first rotating electric machine and the second rotating electric machine is limited to a relatively small value. This can inhibit the fluctuations in the driving force of the vehicle, not expected by the driver, occurring as a result of a sudden change in the output torque of the first rotating electric machine and the second rotating electric machine being transmitted to the wheel from occurring.

What is claimed is:

1. A hybrid drive system comprising:
   an input member connected to an engine;
   an output member connected to a wheel;
   a first rotating electric machine;
   a second rotating electric machine;
   a differential gearing;
   a controller that controls the first rotating electric machine and the second rotating electric machine; and
   an electric power supplier that supplies the first rotating electric machine and the second rotating electric machine with electric power, wherein:
   the differential gearing includes a first rotating element, a second rotating element, and a third rotating element, the first rotating electric machine is connected to the first rotating element, the input member is connected to the second rotating element, and at least one of the output member and the second rotating electric machine is connected to the third rotating element;

the controller performs a fluctuation offset control that controls an output torque of the second rotating electric machine so as to offset torque fluctuations of the output member caused by fluctuations in an output torque of the first rotating electric machine; and the controller performs a torque limiting control that limits the output torque of the first rotating electric machine in a positive direction while limiting the output torque of the second rotating electric machine when the electric power supplier runs into a predetermined low voltage state.

2. The hybrid drive system according to claim 1, wherein the controller controls, upon the torque limiting control, such that the first rotating electric machine outputs torque in a negative direction only while making the output torque of the first rotating electric machine in the positive direction zero.

3. The hybrid drive system according to claim 2, wherein the controller cancels the limiting of the output torque of the first rotating electric machine in the torque limiting control when the output member is fixed.

4. The hybrid drive system according to claim 2, wherein the controller determines that the electric power supplier is in the predetermined low voltage state when an output voltage thereof becomes equal to, or lower than, a predetermined low voltage threshold value.

5. The hybrid drive system according to claim 4, wherein the controller establishes a limit value of the output torque of the second rotating electric machine upon the torque limiting control such that the output voltage of the electric power supplier becomes greater than the predetermined low voltage threshold value.

6. The hybrid drive system according to claim 2, wherein the controller cancels the torque limiting control when the electric power supplier recovers from the predetermined low voltage state and, if the engine is in a stationary state at that time, causes the first rotating electric machine to output torque in the positive direction to rotatably drive the input member and thereby start the engine.

7. The hybrid drive system according to claim 2, wherein the controller allows, upon the torque limiting control, a rate of change of the output torque of the first rotating electric machine to become greater than that at any timing other than during execution of the torque limiting control.

8. The hybrid drive system according to claim 1, further comprising:

an output differential gearing distributing a driving force to the wheel, wherein:

the output member is connected to the wheel via the output differential gearing; and the second rotating electric machine is connected so as to be capable of transmitting the output torque of the second rotating electric machine to a power transmission system from the output member to the output differential gearing.

* * * * *